(12) United States Patent
Yamamoto et al.

(10) Patent No.: US 12,362,965 B2
(45) Date of Patent: Jul. 15, 2025

(54) RELAY DEVICE, VEHICLE, COMMUNICATION METHOD, AND COMMUNICATION PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Yusuke Yamamoto, Osaka (JP); Hideyuki Tanaka, Osaka (JP); Tatsuya Izumi, Osaka (JP); Yojiro Suyama, Osaka (JP); Takeshi Hagihara, Yokkaichi (JP); Darmawan Go, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 17/615,174

(22) PCT Filed: Apr. 30, 2020

(86) PCT No.: PCT/JP2020/018254
§ 371 (c)(1),
(2) Date: Nov. 30, 2021

(87) PCT Pub. No.: WO2021/019860
PCT Pub. Date: Feb. 4, 2021

(65) Prior Publication Data
US 2022/0239528 A1 Jul. 28, 2022

(30) Foreign Application Priority Data

Aug. 1, 2019 (JP) ................................. 2019-142205

(51) Int. Cl.
*H04L 12/46* (2006.01)
*H04L 12/40* (2006.01)

(52) U.S. Cl.
CPC .............. *H04L 12/46* (2013.01); *H04L 12/40* (2013.01); *H04L 2012/40215* (2013.01)

(58) Field of Classification Search
CPC .............................. H04L 12/40; H04L 12/46; H04L 2012/40215
(Continued)

(56) References Cited

U.S. PATENT DOCUMENTS

| 5,907,540 A | 5/1999 | Hayashi |
| 2002/0146002 A1 | 10/2002 | Sato |

(Continued)

FOREIGN PATENT DOCUMENTS

| CN | 102333118 A | 1/2012 |
| CN | 106961437 A | 7/2017 |

(Continued)

OTHER PUBLICATIONS

U.S. Appl. No. 17/624,784, filed Jan. 4, 2022 in the name of Yojiro Suyama et al.

(Continued)

*Primary Examiner* — James E Springer
(74) *Attorney, Agent, or Firm* — Oliff PLC

(57) ABSTRACT

In a system including a plurality of in-vehicle networks, information regarding the network configuration of function units connected to different types of transmission paths can be easily used. A relay device includes: an acquisition unit configured to acquire second function unit information of the function unit connected to the second transmission path, (Continued)

the second function unit information being function unit information that includes information regarding a network configuration of a layer of a lower order than an application layer; and a conversion unit configured to perform a conversion process of converting the second function unit information acquired by the acquisition unit into information that is able to be registered into a database of one or a plurality of pieces of first function unit information being function unit information of one or a plurality of the function units each connected to a corresponding first transmission path.

12 Claims, 19 Drawing Sheets

(58) Field of Classification Search
USPC .................................................. 709/224
See application file for complete search history.

(56) References Cited

U.S. PATENT DOCUMENTS

| | | | |
|---|---|---|---|
| 2007/0185624 A1 | 8/2007 | Duddles et al. | |
| 2008/0059806 A1 | 3/2008 | Kishida et al. | |
| 2010/0002710 A1* | 1/2010 | Isoyama | H04L 12/66 370/401 |
| 2010/0302974 A1 | 12/2010 | Niiyama et al. | |
| 2010/0313242 A1 | 12/2010 | Sato | |
| 2012/0054835 A1 | 3/2012 | Oda et al. | |
| 2012/0277949 A1 | 11/2012 | Ghimire et al. | |
| 2013/0010640 A1 | 1/2013 | Higuchi et al. | |
| 2014/0068099 A1 | 3/2014 | Komori | |
| 2015/0145648 A1 | 5/2015 | Winkelman | |
| 2015/0172298 A1* | 6/2015 | Otsuka | H04L 63/123 726/30 |
| 2016/0315766 A1 | 10/2016 | Ujiie et al. | |
| 2016/0373449 A1 | 12/2016 | Haga et al. | |
| 2017/0134164 A1 | 5/2017 | Haga et al. | |
| 2017/0331767 A1 | 11/2017 | Zinner | |
| 2017/0352210 A1 | 12/2017 | Maiwand et al. | |
| 2018/0009446 A1 | 1/2018 | Ricci | |
| 2018/0077062 A1* | 3/2018 | Park | G07C 5/0841 |
| 2018/0115490 A1* | 4/2018 | Kawasaki | H04L 47/2441 |
| 2018/0139634 A1 | 5/2018 | Zhu et al. | |
| 2018/0367546 A1 | 12/2018 | Miyashita | |
| 2019/0044730 A1 | 2/2019 | Woo et al. | |
| 2019/0173912 A1 | 6/2019 | Ujiie et al. | |
| 2019/0197468 A1 | 6/2019 | Endo et al. | |
| 2019/0334897 A1 | 10/2019 | Anzai et al. | |
| 2019/0356608 A1* | 11/2019 | Tanaka | H04L 49/50 |
| 2019/0394065 A1 | 12/2019 | Okubo et al. | |
| 2020/0029213 A1 | 1/2020 | Nölscher et al. | |
| 2020/0084025 A1 | 3/2020 | Ujiie et al. | |
| 2020/0106704 A1 | 4/2020 | Iwata et al. | |
| 2020/0137049 A1 | 4/2020 | Ogawa et al. | |
| 2020/0220716 A1 | 7/2020 | Haga et al. | |
| 2020/0366529 A1* | 11/2020 | Park | H04L 12/66 |
| 2021/0028925 A1 | 1/2021 | Ujiie et al. | |
| 2021/0329002 A1 | 10/2021 | Huh et al. | |

FOREIGN PATENT DOCUMENTS

| | | | |
|---|---|---|---|
| CN | 108881247 A | 11/2018 | |
| JP | 2002-314573 A | 10/2002 | |
| JP | 2003-046536 A | 2/2003 | |
| JP | 2003-244185 A | 8/2003 | |
| JP | 2008-059450 A | 3/2008 | |
| JP | 2010-183204 A | 8/2010 | |
| JP | 2010-283607 A | 12/2010 | |
| JP | 2013-017021 A | 1/2013 | |
| JP | 2013-193598 A | 9/2013 | |
| JP | 2016-127299 A | 7/2016 | |
| JP | 2016-134170 A | 7/2016 | |
| JP | 2016-152429 A | 8/2016 | |
| JP | 2017-005617 A | 1/2017 | |
| JP | 2017-059210 A | 3/2017 | |
| JP | 2017-212728 A | 11/2017 | |
| JP | 2017-220220 A | 12/2017 | |
| JP | 2018-117254 A | 7/2018 | |
| JP | 2018113505 A * | 7/2018 | ............... H04B 7/15 |
| JP | 2018-152758 A | 9/2018 | |
| JP | 2018-174481 A | 11/2018 | |
| JP | 2018-192876 A | 12/2018 | |
| JP | 2019-016247 A | 1/2019 | |
| WO | 2013/161873 A1 | 10/2013 | |
| WO | 2016/075865 A1 | 5/2016 | |
| WO | 2016/075869 A1 | 5/2016 | |
| WO | 2016/204081 A1 | 12/2016 | |

OTHER PUBLICATIONS

U.S. Appl. No. 17/622,892, filed Dec. 27, 2021 in the name of Yojiro Suyama et al.
U.S. Appl. No. 17/612,136, filed Nov. 17, 2021 in the name of Yusuke Yamamoto et al.
Feb. 15, 2023 Office Action issued in U.S. Appl. No. 17/622,892.
Jun. 28, 2023 Office Action issued in U.S. Appl. No. 17/622,892.
Oct. 20, 2023 Notice of Allowance issued in U.S. Appl. No. 17/622,892.
Jan. 24, 2024 U.S. Office Action issued in U.S. Appl. No. 17/624,784.
Jan. 4, 2024 U.S. Office Action issued in U.S. Appl. No. 17/612,136.
Aug. 30, 2024 Office Action issued in U.S. Appl. No. 18/403,973.
U.S. Appl. No. 18/781,541.
Apr. 26, 2024 Notice Of Allowance issued in U.S. Appl. No. 17/622,892.
Apr. 15, 2024 Office Action issued in U.S. Appl. No. 17/612,136.
May 15, 2024 U.S. Notice of Allowance issued in U.S. Appl. No. 17/624,784.
Oct. 28, 2024 Notice of Allowance issued in U.S. Appl. No. 17/624,784.
Sep. 29, 2024 Office Action issued in U.S. Appl. No. 17/612,136.
Dec. 9, 2024 Notice of Allowance issued in U.S. Appl. No. 18/403,973.
Jan. 27, 2025 Notice of Allowance issued in U.S. Appl. No. 17/612,136.
Feb. 4, 2025 Notice of Allowance issued in U.S. Appl. No. 17/624,784.
May 15, 2025 Notice of Allowance received in U.S. Appl. No. 18/403,973.
May 20, 2025 Notice of Allowance Issued in U.S. Appl. No. 17/612,136.
May 21, 2025 Notice of Allowance received in U.S. Appl. No. 17/624,784.

* cited by examiner

FIG. 7

| | ID OF IN-VEHICLE ECU | FUNCTION OF IN-VEHICLE ECU | LAG SUPPORT | ID OF IN-VEHICLE ECU OF DATA TRANSMISSION DESTINATION | COMMUNICATION TRAFFIC |
|---|---|---|---|---|---|
| IN-VEHICLE ECU 111A | 0x04 | G FUNCTION | True | 0x1A | 20 |
| IN-VEHICLE ECU 111B | 0x05 | E FUNCTION | True | 0x1B | 30 |
| ... | ... | ... | ... | ... | ... |

| | ID OF IN-VEHICLE ECU | FUNCTION OF IN-VEHICLE ECU | LAG SUPPORT | ID OF IN-VEHICLE ECU OF DATA TRANSMISSION DESTINATION | COMMUNICATION TRAFFIC | |
|---|---|---|---|---|---|---|
| IN-VEHICLE ECU 111A | 0x04 | G FUNCTION | True | 0x1A | 20 | ... |
| IN-VEHICLE ECU 111B | 0x05 | E FUNCTION | True | 0x1B | 30 | ... |
| IN-VEHICLE ECU 112A | 0x01 | ... | ... | ... | ... | ... |

| SYSTEM FUNCTION INFORMATION INCLUDED IN FUNCTION UNIT INFORMATION F2 | FUNCTION DEFINED IN FUNCTION UNIT INFORMATION F2 | CORRESPONDING FUNCTION IN FUNCTION UNIT INFORMATION F1 |
|---|---|---|
| 0b00 | A FUNCTION | D FUNCTION |
| 0b01 | B FUNCTION | D FUNCTION |
| 0b10 | C FUNCTION | E FUNCTION |
| 0b11 | Reserved | ERROR |

FIG. 10

| | ID OF IN-VEHICLE ECU | FUNCTION OF IN-VEHICLE ECU | LAG SUPPORT | ID OF IN-VEHICLE ECU OF DATA TRANSMISSION DESTINATION | COMMUNICATION TRAFFIC | ... |
|---|---|---|---|---|---|---|
| IN-VEHICLE ECU 111A | 0x04 | G FUNCTION | True | 0x1A | 20 | ... |
| IN-VEHICLE ECU 111B | 0x05 | E FUNCTION | True | 0x1B | 30 | ... |
| IN-VEHICLE ECU 112A | 0x01 | D FUNCTION | | | | ... |
| ... | ... | ... | ... | ... | ... | ... |

| COMMUNICATION PROTOCOL | PRESENCE OR ABSENCE OF LAG SUPPORT |
|---|---|
| ETHERNET | PRESENT |
| CAN | ABSENT |
| ... | ... |

| | ID OF IN-VEHICLE ECU | FUNCTION OF IN-VEHICLE ECU | LAG SUPPORT | ID OF IN-VEHICLE ECU OF DATA TRANSMISSION DESTINATION | COMMUNICATION TRAFFIC | DB |
|---|---|---|---|---|---|---|
| IN-VEHICLE ECU 111A | 0x04 | G FUNCTION | True | 0x1A | 20 | ... |
| IN-VEHICLE ECU 111B | 0x05 | E FUNCTION | True | 0x1B | 30 | ... |
| IN-VEHICLE ECU 112A | 0x01 | D FUNCTION | False | ... | ... | ... |
| ... | ... | ... | ... | ... | ... | ... |

FIG. 13

| COMMUNICATION PATH | TRANSMISSION SOURCE IN-VEHICLE ECU | TRANSMISSION DESTINATION IN-VEHICLE ECU | COMMUNICATION TRAFFIC |
|---|---|---|---|
| COMMUNICATION PATH R11 | IN-VEHICLE ECU 111C | IN-VEHICLE ECU 112E | 15 |
| COMMUNICATION PATH R12 | IN-VEHICLE ECU 112E | IN-VEHICLE ECU 111A | 5 |
| COMMUNICATION PATH R13 | IN-VEHICLE ECU 111A | IN-VEHICLE ECU 112C | 5 |

FIG. 15

| COMMUNICATION PATH | TRANSMISSION SOURCE IN-VEHICLE ECU | TRANSMISSION DESTINATION IN-VEHICLE ECU | COMMUNICATION TRAFFIC |
|---|---|---|---|
| COMMUNICATION PATH R14 | IN-VEHICLE ECU 111D | IN-VEHICLE ECU 112F | 5 |
| COMMUNICATION PATH R15 | IN-VEHICLE ECU 112F | IN-VEHICLE ECU 112A | 20 |

FIG. 17

| COMMUNICATION PATH | TRANSMISSION SOURCE IN-VEHICLE ECU | TRANSMISSION DESTINATION IN-VEHICLE ECU | COMMUNICATION TRAFFIC |
|---|---|---|---|
| COMMUNICATION PATH R1 | IN-VEHICLE ECU 111C | IN-VEHICLE ECU 111B | 15 |
| COMMUNICATION PATH R2 | IN-VEHICLE ECU 111B | IN-VEHICLE ECU 111D | 15 |

RELAY DEVICE, VEHICLE, COMMUNICATION METHOD, AND COMMUNICATION PROGRAM

TECHNICAL FIELD

The present disclosure relates to a relay device, a vehicle, a communication method, and a communication program.

This application claims priority on Japanese Patent Application No. 2019-142205 filed on Aug. 1, 2019, the entire content of which is incorporated herein by reference.

BACKGROUND ART

PATENT LITERATURE 1 (Japanese Laid-Open Patent Publication No. 2017-212728) discloses a network hub as below. That is, the network hub is a network hub connected to a bus of a first network and to a second network in an in-vehicle network system that includes the first network where transmission of first-type frames relating to traveling control of a vehicle is performed through a bus in accordance with a first communication protocol, and the second network where transmission of second-type frames is performed in accordance with a second communication protocol different from the first communication protocol. The network hub includes: a first reception buffer; a second reception buffer; a first transmission buffer; a second transmission buffer; a first reception unit that sequentially receives the first-type frames from the bus and stores data in the first-type frames into the first reception buffer; a second reception unit that sequentially receives the second-type frames from the second network and stores data in the second-type frames into the second reception buffer; a selection unit that selects the first network or the second network that is the destination of data being the content of either one of the first reception buffer and the second reception buffer, stores the data into the first transmission buffer when having selected the first network, and stores the data into the second transmission buffer when having selected the second network; and a transmission unit that transmits yet-to-be transmitted data in the first transmission buffer and yet-to-be transmitted data in the second transmission buffer. The transmission unit performs priority transmission control in which yet-to-be transmitted data in a priority transmission buffer being one of the first transmission buffer and the second transmission buffer is transmitted with priority over yet-to-be transmitted data in a non-priority transmission buffer, which is the other one.

CITATION LIST

Patent Literature

PATENT LITERATURE 1: Japanese Laid-Open Patent Publication No. 2017-212728

SUMMARY OF INVENTION (1) A relay device of the present disclosure is installed in a vehicle and configured to relay information transmitted and received between a function unit connected to a first transmission path and a function unit connected to a second transmission path. The relay device includes: an acquisition unit configured to acquire second function unit information of the function unit connected to the second transmission path, the second function unit information being function unit information that includes information regarding a network configuration of a layer of a lower order than an application layer; and a conversion unit configured to perform a conversion process of converting the second function unit information acquired by the acquisition unit into information that is able to be registered into a database of one or a plurality of pieces of first function unit information being function unit information of one or a plurality of the function units each connected to a corresponding first transmission path.

(8) A relay device of the present disclosure is installed in a vehicle. The relay device includes: a communication unit configured to perform first communication being communication according to a first communication protocol, and second communication being communication according to a second communication protocol; and a generation unit configured to generate, on the basis of network information that is used in the second communication, network information to be used in the first communication.

(11) A communication method of the present disclosure is to be performed in a relay device installed in a vehicle and configured to relay information transmitted and received between a function unit connected to a first transmission path and a function unit connected to a second transmission path. The communication method includes the steps of: acquiring second function unit information of the function unit connected to the second transmission path, the second function unit information being function unit information that includes information regarding a network configuration of a layer of a lower order than an application layer; and performing a conversion process of converting the acquired second function unit information into information that is able to be registered into a database of one or a plurality of pieces of first function unit information of one or a plurality of the function units each connected to a corresponding first transmission path, the first function unit information being function unit information that includes information regarding a network configuration of a layer of a lower order than an application layer.

(12) A communication program of the present disclosure is to be used in a relay device installed in a vehicle and configured to relay information transmitted and received between a function unit connected to a first transmission path and a function unit connected to a second transmission path. The communication program is for causing a computer to function as: an acquisition unit configured to acquire second function unit information of the function unit connected to the second transmission path, the second function unit information being function unit information that includes information regarding a network configuration of a layer of a lower order than an application layer; and a conversion unit configured to perform a conversion process of converting the second function unit information acquired by the acquisition unit into information that is able to be registered into a database of one or a plurality of pieces of first function unit information of one or a plurality of the function units each connected to a corresponding first transmission path, the first function unit information being function unit information that includes information regarding a network configuration of a layer of a lower order than an application layer.

One mode of the present disclosure can be realized as a semiconductor integrated circuit that realizes a part or the entirety of the relay device or can be realized as a system that includes the relay device. One mode of the present disclosure can be realized as a semiconductor integrated circuit that realizes a part or the entirety of a system including the relay device, or can be realized as a program for causing a computer to execute process steps in the system including the relay device.

BRIEF DESCRIPTION OF DRAWINGS

FIG. 7 shows an example of a database in a storage unit of the relay device according to the embodiment of the present disclosure.

FIG. 8 shows an example of a database after update in the storage unit of the relay device according to the embodiment of the present disclosure.

FIG. 9 shows an example of a conversion table in the storage unit of the relay device according to the embodiment of the present disclosure.

FIG. 10 shows another example of the database after update in the storage unit of the relay device according to the embodiment of the present disclosure.

FIG. 11 shows an example of a support table in the storage unit of the relay device according to the embodiment of the present disclosure.

FIG. 12 shows another example of the database after update in the storage unit of the relay device according to the embodiment of the present disclosure.

FIG. 13 shows an example of communication that should be newly performed in a new network according to the embodiment of the present disclosure.

FIG. 15 shows another example of communication that should be newly performed in a new network according to the embodiment of the present disclosure.

FIG. 17 shows an example of communication stopped in a new network according to the embodiment of the present disclosure.

DESCRIPTION OF EMBODIMENTS

Figure 1:
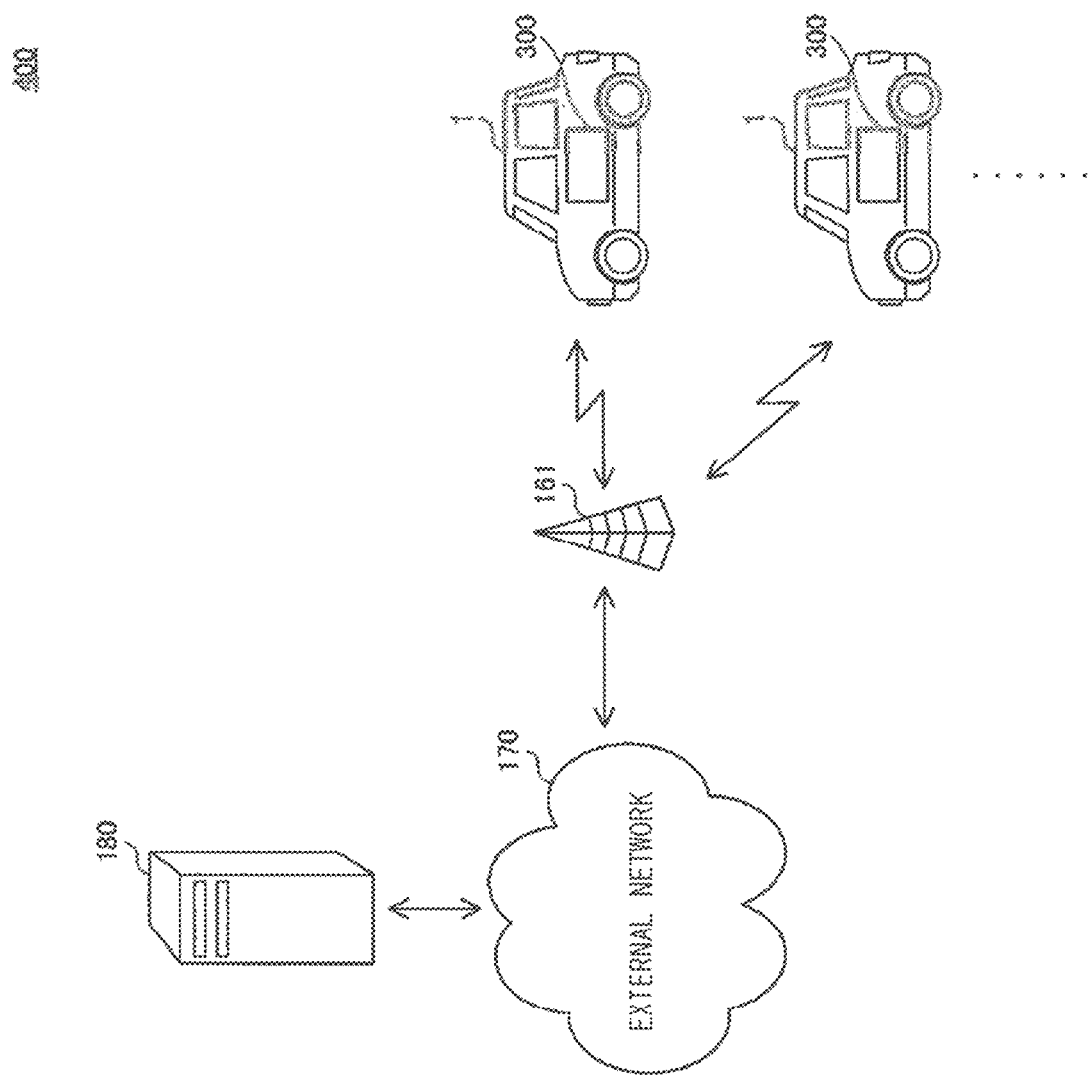
FIG. 1 shows a configuration of a communication system according to an embodiment of the present disclosure.

In recent years, there has been a demand for a technology for performing transmission of various types of data between a plurality of in-vehicle networks that respectively perform communications via transmission paths in accordance with different communication protocols.

[Problems to be Solved by the Present Disclosure]

In such a system including a plurality of in-vehicle networks, a technology that enables easy use of information regarding the network configuration of function units connected to different types of transmission paths, is desired.

The present disclosure has been made in order to solve the above problem. An object of the present disclosure is to provide a relay device, a vehicle, a communication method, and a communication program that enable easy use of information regarding the network configuration of function units connected to different types of transmission paths in a system including a plurality of in-vehicle networks.

[Effects of the Present Disclosure]

According to the present disclosure, information regarding the network configuration of function units connected to different types of transmission paths can be easily used.

[Description of Embodiment of the Present Disclosure]

First, the contents of an embodiment of the present disclosure are listed and described.

(1) A relay device according to an embodiment of the present disclosure is installed in a vehicle and configured to relay information transmitted and received between a function unit connected to a first transmission path and a function unit connected to a second transmission path. The relay device includes: an acquisition unit configured to acquire second function unit information of the function unit connected to the second transmission path, the second function unit information being function unit information that includes information regarding a network configuration of a layer of a lower order than an application layer; and a conversion unit configured to perform a conversion process of converting the second function unit information acquired by the acquisition unit into information that is able to be registered into a database of one or a plurality of pieces of first function unit information being function unit information of one or a plurality of the function units each connected to a corresponding first transmission path.

Thus, with this configuration in which the conversion process of converting the second function unit information of the function unit connected to the second transmission path into information that is able to be registered into the database of first function unit information of the function units connected to the first transmission paths is performed, the function unit information after the conversion can be registered into the database, and the second function unit information can be referred to and used, similar to the first function unit information. Therefore, information regarding the network configuration of function units connected to different types of transmission paths can be easily used.

(2) Preferably, the conversion process includes a process of applying a second element being an element of the second function unit information to a first element being an element of the first function unit information and being an element having a definition different from that of the second element.

With this configuration, the element of the second function unit information can be replaced with an element of the first function unit information, and the value of the element in the second function unit information can be referred to and used as the value of the element of the first function unit information.

(3) Preferably, the conversion process includes a process of converting a value of an element of the second function unit information in accordance with a predetermined rule.

With this configuration, the value, of the element of the second function unit information, converted in accordance with the predetermined rule can be referred to and used as the value of the element of the first function unit information.

(4) Preferably, the relay device further includes a storage unit, and the conversion process includes a process of acquiring, from the storage unit, information corresponding to the second function unit information or information based on the second function unit information.

With this configuration, the information corresponding to the second function unit information or the information based on the second function unit information in the storage unit can be referred to and used as the first function unit information.

(5) Preferably, the conversion process includes a process of changing a data size of a second element being an element of the second function unit information to a data size of a first element being an element of the first function unit information and being an element corresponding to the second element.

With this configuration, the element of the second function unit information after the data size has been changed can be referred to and used as an element of the first function unit information.

(6) Preferably, on the basis of the second function unit information acquired by the acquisition unit, the conversion unit further performs at least one of registration of the second function unit information after the conversion process into the database, and removal of the second function unit information registered in the database.

With this configuration, the database can be flexibly updated on the basis of the content of the second function unit information.

(7) Preferably, the relay device further includes a provision unit configured to provide, on the basis of the database, the second function unit information having been converted by the conversion unit, to a management unit configured to update configuration information of a network including one or a plurality of function units each connected to a corresponding first transmission path and one or a plurality of function units each connected to a corresponding second transmission path.

With this configuration, the second function unit information after the conversion can be used in construction of a network for which the network configuration and restriction of a layer of a lower order than the application layer are taken into consideration.

(8) A relay device according to the embodiment of the present disclosure is installed in a vehicle. The relay device includes: a communication unit configured to perform first communication being communication according to a first communication protocol, and second communication being communication according to a second communication protocol; and a generation unit configured to generate, on the basis of network information that is used in the second communication, network information to be used in the first communication.

Thus, with this configuration in which network information to be used in the first communication is generated on the basis of network information that is used in the second communication, two types of network information that are used in communication via different types of transmission paths, for example, can be registered into the same database. Accordingly, the two types of network information can be referred to and used. Therefore, information regarding the network configuration of function units connected to different types of transmission paths can be easily used.

(9) Preferably, the first communication protocol is Ethernet (registered trademark), and the second communication protocol is CAN (Controller Area Network) (registered trademark).

With this configuration, in a network in which communication according to Ethernet and communication according to CAN are performed, network information that is used in communication according to Ethernet and network information that is used in communication according to CAN can be registered into the same database.

(10) A vehicle according to the embodiment of the present disclosure includes the relay device.

With this configuration, in the vehicle including the relay device, information regarding the network configuration of function units connected to different types of transmission paths can be easily used.

(11) A communication method according to the embodiment of the present disclosure is to be performed in a relay device installed in a vehicle and configured to relay information transmitted and received between a function unit connected to a first transmission path and a function unit connected to a second transmission path. The communication method includes the steps of: acquiring second function unit information of the function unit connected to the second transmission path, the second function unit information being function unit information that includes information regarding a network configuration of a layer of a lower order than an application layer; and performing a conversion process of converting the acquired second function unit information into information that is able to be registered into a database of one or a plurality of pieces of first function unit information of one or a plurality of the function units each connected to a corresponding first transmission path, the first function unit information being function unit information that includes information regarding a network configuration of a layer of a lower order than an application layer.

Thus, with the method in which the conversion process of converting the second function unit information of the function unit connected to the second transmission path into information that is able to be registered into the database of first function unit information of the function units connected to the first transmission paths is performed, the second function unit information after the conversion can be registered into the database, and the second function unit information can be referred to and used, similar to the first function unit information. Therefore, information regarding the network configuration of function units connected to different types of transmission paths can be easily used.

(12) A communication program according to the embodiment of the present disclosure is to be used in a relay device installed in a vehicle and configured to relay information transmitted and received between a function unit connected to a first transmission path and a function unit connected to a second transmission path. The communication program is for causing a computer to function as: an acquisition unit configured to acquire second function unit information of the function unit connected to the second transmission path, the second function unit information being function unit information that includes information regarding a network configuration of a layer of a lower order than an application layer; and a conversion unit configured to perform a conversion process of converting the second function unit information acquired by the acquisition unit into information that is able to be registered into a database of one or a plurality of pieces of first function unit information of one or a plurality of the function units each connected to a corresponding first transmission path, the first function unit information being function unit information that includes information regarding a network configuration of a layer of a lower order than an application layer.

Thus, with this configuration in which the conversion process of converting the second function unit information of the function unit connected to the second transmission path into information that is able to be registered into the database of first function unit information of the function units connected to the first transmission paths is performed, the function unit information after the conversion can be registered into the database DB, and the second function unit information can be referred to and used, similar to the first function unit information. Therefore, information regarding the network configuration of function units connected to different types of transmission paths can be easily used.

Hereinafter, an embodiment of the present disclosure will be described with reference to the drawings. In the drawings, the same or corresponding parts are denoted by the same reference signs, and description thereof is not repeated. At least some parts of the embodiment described below may be combined as desired.

[Vehicle Communication System]

FIG. 1 shows a configuration of a communication system according to an embodiment of the present disclosure.

With reference to FIG. 1, a communication system 400 includes a server 180 and one or a plurality of vehicle communication systems 300. Each vehicle communication system 300 is installed in a vehicle 1.

Figure 2:
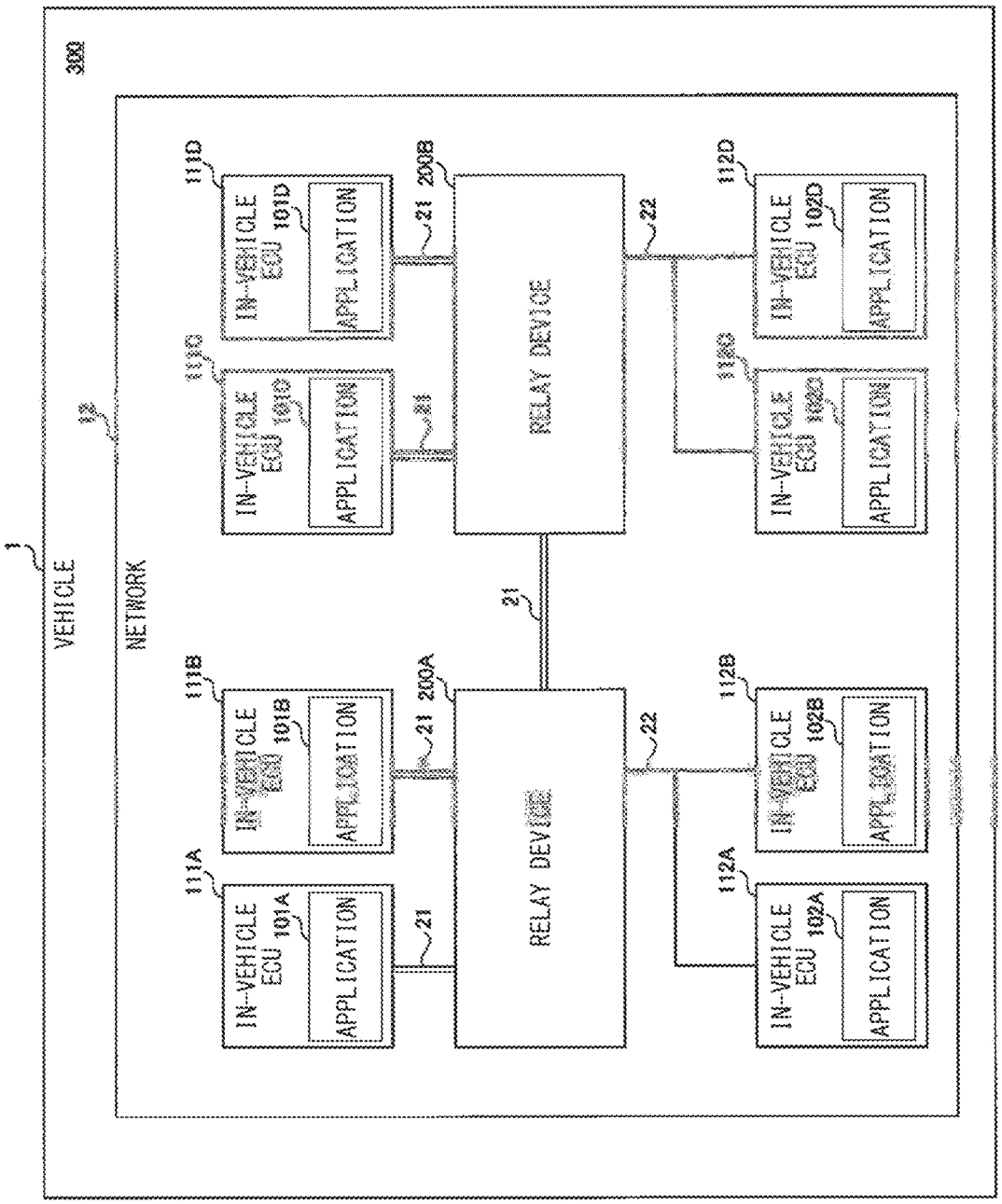
FIG. 2 shows an example of a configuration of a vehicle communication system according to the embodiment of the present disclosure.

FIG. 2 shows an example of a configuration of a vehicle communication system according to the embodiment of the present disclosure.

With reference to FIG. 2, the vehicle communication system 300 includes: one or a plurality of in-vehicle ECUs (Electronic Control Units) 111; one or a plurality of in-vehicle ECUs 112; and relay devices 200A, 200B. Specifically, the vehicle communication system 300 includes in-vehicle ECUs 111A to 111D as the in-vehicle ECUs 111, and in-vehicle ECUs 112A to 112D as the in-vehicle ECUs 112. Hereinafter, each of the relay devices 200A, 200B will also be referred to as a relay device 200.

The in-vehicle ECUs 111A to 111D each include an application 101. The in-vehicle ECUs 112A to 112D each include an application 102.

More specifically, as the application 101, the in-vehicle ECU 111A includes an application 101A, the in-vehicle ECU 111B includes an application 101B, the in-vehicle ECU 111C includes an application 101C, and the in-vehicle ECU 111D includes an application 101D.

As the application 102, the in-vehicle ECU 112A includes an application 102A, the in-vehicle ECU 112B includes an application 102B, the in-vehicle ECU 112C includes an application 102C, and the in-vehicle ECU 112D includes an application 102D.

Each in-vehicle ECU 111 is connected to a relay device 200 via an Ethernet cable 21. Each in-vehicle ECU 112 is connected to a relay device 200 via a CAN bus 22. The plurality of Ethernet cables 21 are an example of a first transmission path. The CAN bus 22 is an example of a second transmission path.

Specifically, the in-vehicle ECU 111A, 111B is connected to the relay device 200A via an Ethernet cable 21, the in-vehicle ECU 112A, 112B is connected to the relay device 200A via a CAN bus 22, the in-vehicle ECU 111C, 111D is connected to the relay device 200B via an Ethernet cable 21, and the in-vehicle ECU 112C, 112D is connected to the relay device 200B via a CAN bus 22.

The relay device 200A and the relay device 200B are connected to each other via an Ethernet cable 21.

The in-vehicle ECUs 111A to 111D, the in-vehicle ECUs 112A to 112D, and the relay devices 200A, 200B form a network 12.

Each in-vehicle ECU 111, each in-vehicle ECU 112, each application 101, and each application 102 are examples of function units that are installed in the vehicle 1 among function units in the network 12.

The vehicle communication system 300 need not necessarily be provided with four in-vehicle ECUs 111 and may be provided with three or less or five or more in-vehicle ECUs 111. The vehicle communication system 300 need not necessarily be provided with four in-vehicle ECUs 112 and may be provided with three or less or five or more in-vehicle ECUs 112.

The vehicle communication system 300 need not necessarily be configured such that one application 101 is installed in one in-vehicle ECU 111, and may be configured such that two or more applications 101 are installed in one in-vehicle ECU 111. The vehicle communication system 300 need not necessarily be configured such that one application 102 is installed in one in-vehicle ECU 112, and may be configured such that two or more applications 102 are installed in one in-vehicle ECU 112.

The vehicle communication system 300 need not necessarily be provided with two relay devices 200. The vehicle communication system 300 may be provided with only the relay device 200A or the relay device 200B, or may be provided with three or more relay devices 200.

The network 12 may include, as function units, an external device that is located outside the vehicle 1 and that can communicate with a TCU described later, and an application provided in the external device.

The in-vehicle ECUs 111, 112 are, for example, a TCU (Telematics Communication unit), an automated driving ECU, an engine ECU, a sensor, a navigation device, a human machine interface, a camera, and the like.

Each relay device 200 is a gateway device, for example, and can relay data between a plurality of in-vehicle ECUs 111, 112 connected to the relay device 200. The relay device 200 can perform a relay process in accordance with, for example, a layer 2, and a layer 3 of a higher order than the layer 2, and performs a relay process of a frame between in-vehicle ECUs 111, 112 that belong to the same VLAN, and a relay process of a frame between in-vehicle ECUs 111, 112 that belong to different VLANs, for example.

More specifically, the relay device 200 performs a relay process of a frame in accordance with a communication standard of at least one of Ethernet and CAN. Ethernet is an example of a first communication protocol, and CAN is an example of a second communication protocol. Hereinafter, a frame according to the Ethernet communication standard will be referred to as an Ethernet frame, and a frame according to the CAN communication standard will be referred to as a CAN frame. An IP packet is stored in the Ethernet frame.

The relay device 200 relays an Ethernet frame sent and received between in-vehicle ECUs 111 connected via Ethernet cables. The relay device 200 relays a CAN frame sent and received between in-vehicle ECUs 112 each connected via a CAN bus.

The relay device 200 generates a CAN frame on the basis of an Ethernet frame received from an in-vehicle ECU 111 connected thereto via an Ethernet cable, and relays the generated CAN frame to an in-vehicle ECU 112 via a CAN bus.

The relay device 200 generates an Ethernet frame on the basis of a CAN frame received from an in-vehicle ECU 112 connected thereto via a CAN bus, and relays the generated Ethernet frame to an in-vehicle ECU 111 via an Ethernet cable.

In the vehicle communication system 300, relay of an Ethernet frame and relay of a CAN frame need not necessarily be performed in accordance with an Ethernet communication standard and a CAN communication standard, respectively. For example, relay of data may be performed in accordance with another communication standard such as FlexRay (registered trademark), MOST (Media Oriented Systems Transport) (registered trademark), or LIN (Local Interconnect Network).

With reference to FIG. 1 and FIG. 2, a TCU being an example of the in-vehicle ECU 111, 112 can communicate with the server 180. Specifically, the TCU can communicate with an external device such as the server 180 via a wireless base station device 161 by using an IP packet, for example.

More specifically, the TCU can perform wireless communication with the wireless base station device 161 in accordance with a communication standard such as LTE (Long Term Evolution) or 3G, for example.

Specifically, for example, in a case where an in-vehicle ECU 111 is a TCU, when the wireless base station device 161 has received an IP packet via an external network 170 from the server 180, the wireless base station device 161 causes the received IP packet to be included in a radio signal, and transmits the radio signal to the TCU.

For example, when the TCU has received, from the wireless base station device 161, the radio signal including the IP packet from the server 180, the TCU acquires the IP packet from the received radio signal, stores the acquired IP packet into an Ethernet frame, and transmits the Ethernet frame to the relay device 200.

Meanwhile, when the TCU has received an Ethernet frame from the relay device 200, the TCU acquires an IP packet from the received Ethernet frame, causes the acquired IP packet to be included in a radio signal, and transmits the radio signal to the wireless base station device 161.

Upon receiving the radio signal from the TCU, the wireless base station device 161 acquires the IP packet from the received radio signal, and transmits the acquired IP packet to the server 180 via the external network 170.

An automated driving ECU being an example of the in-vehicle ECU 111, 112 can communicate with another in-vehicle ECU 111, 112 via a relay device 200, and performs detection of the travelling state of the vehicle 1 by using measurement information from a sensor, and automated driving control based on the detection result, for example.

Each application 101, 102 performs a process of an application layer, for example, thereby performing a predetermined process in the in-vehicle ECU 111, 112 in which the application 101, 102 is installed. For example, an application 101, 102 in a temperature sensor being an example of the in-vehicle ECU 111, 112 generates, in a predetermined cycle, temperature information indicating the outside air temperature of the vehicle 1.

[Relay Device]

Figure 3:
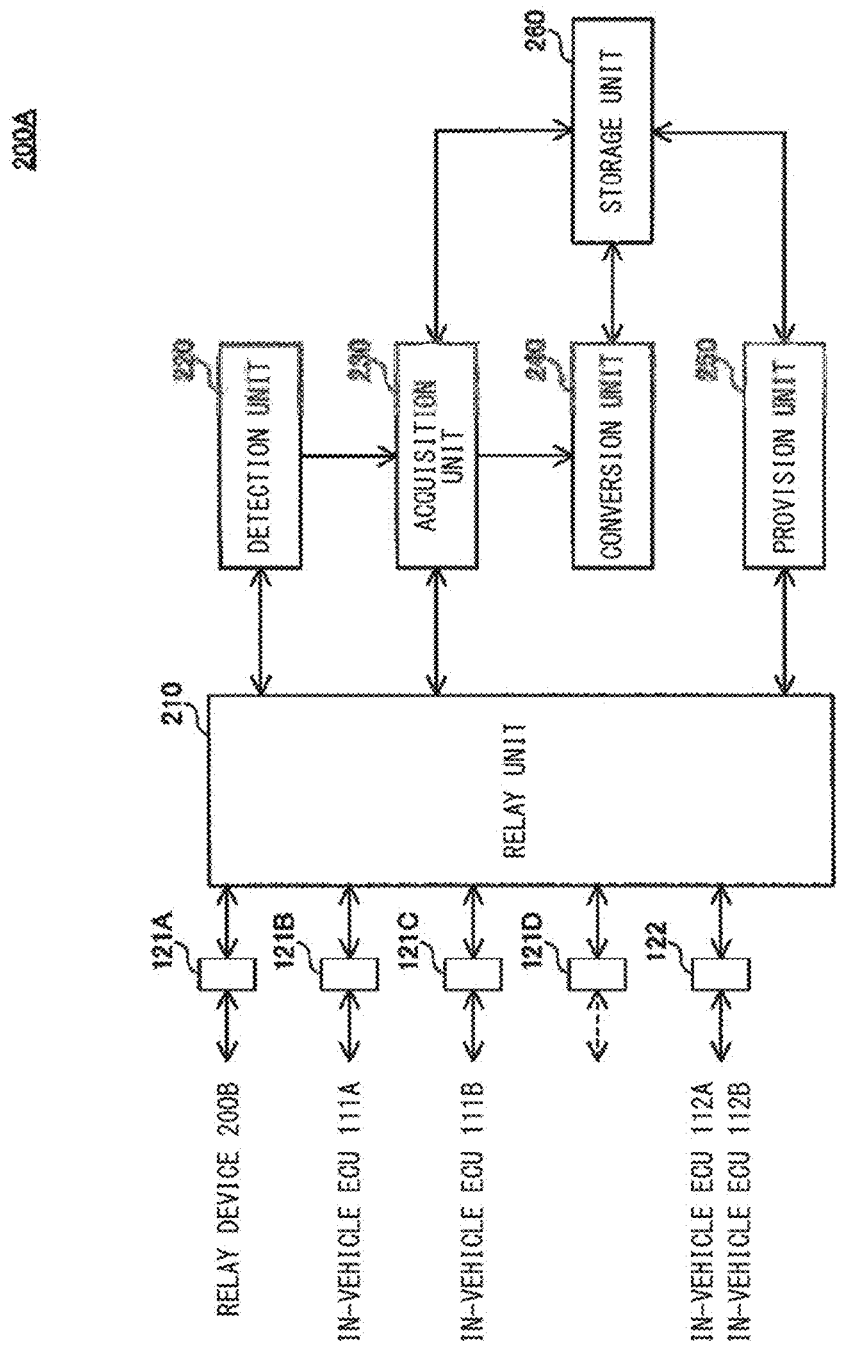
FIG. 3 shows an example of a configuration of a relay device according to the embodiment of the present disclosure.

FIG. 3 shows an example of a configuration of a relay device according to the embodiment of the present disclosure. FIG. 3 shows a configuration of the relay device 200A.

With reference to FIG. 3, the relay device 200A includes communication ports 121A, 121B, 121C, 121D, 122, a relay unit 210, a detection unit 220, an acquisition unit 230, a conversion unit 240, a provision unit 250, and a storage unit 260. The storage unit 260 is a flash memory, for example.

Figure 4:
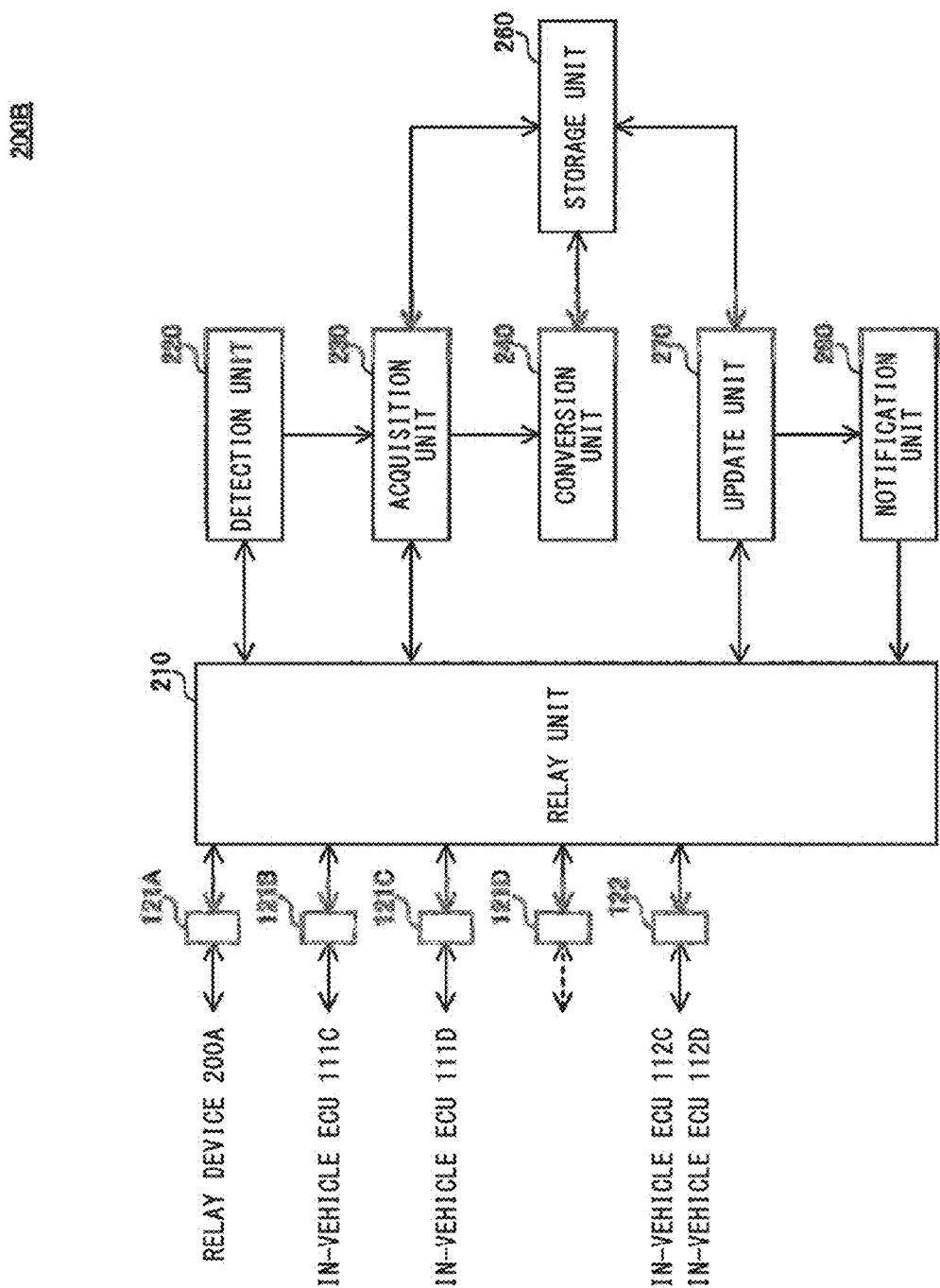
FIG. 4 shows another example of the configuration of the relay device according to the embodiment of the present disclosure.

FIG. 4 shows another example of the configuration of the relay device according to the embodiment of the present disclosure. FIG. 4 shows a configuration of the relay device 200B.

With reference to FIG. 4, the relay device 200B includes an update unit 270 and a notification unit 280 instead of the provision unit 250, when compared with the relay device 200A.

The communication ports 121A, 121B, 121C, 121D are each a terminal to which an Ethernet cable 21 can be connected, for example. Hereinafter, each of the communication ports 121A, 121B, 121C, 121D will also be referred to as a communication port 121.

The communication port 122 is a terminal to which a CAN bus 22 can be connected, for example.

In the example shown in FIG. 2 and FIG. 3, in the relay device 200A, the relay device 200B is connected to the communication port 121A, the in-vehicle ECU 111A is connected to the communication port 121B, the in-vehicle ECU 111B is connected to the communication port 121C, and the in-vehicle ECU 112A and the in-vehicle ECU 112B are connected to the communication port 122.

In the example shown in FIG. 2 and FIG. 4, in the relay device 200B, the relay device 200A is connected to the communication port 121A, the in-vehicle ECU 111C is connected to the communication port 121B, the in-vehicle ECU 111D is connected to the communication port 121C, and the in-vehicle ECU 112C and the in-vehicle ECU 112D are connected to the communication port 122.

[Relay Unit]

The relay unit 210 relays information that is transmitted and received between in-vehicle ECUs 111, 112. The relay unit 210 performs communication according to Ethernet and communication according to CAN. The relay unit 210 is an example of a communication unit.

(Example 1 of Relay Process)

The relay unit 210 relays information that is transmitted and received between in-vehicle ECUs 111 connected to Ethernet cables 21.

More specifically, for example, when the relay unit 210 has received, from a certain in-vehicle ECU 111 via a corresponding communication port 121, an Ethernet frame addressed to an in-vehicle ECU 111 connected to the relay device 200 to which the relay unit 210 belongs, the relay unit 210 relays the received Ethernet frame to the destination in-vehicle ECU 111 via a corresponding communication port 121.

When the relay unit 210 has received, from a certain in-vehicle ECU 111 via a corresponding communication port 121, an Ethernet frame addressed to an in-vehicle ECU 111 connected to another relay device 200, the relay unit 210 relays the received Ethernet frame to the other relay device 200 via the communication port 121A.

When the relay unit 210 has received, from another relay device 200 via the communication port 121A, an Ethernet frame addressed to an in-vehicle ECU 111 connected to the relay device 200 to which the relay unit 210 belongs, the relay unit 210 relays the received Ethernet frame to the destination in-vehicle ECU 111 via a corresponding communication port 121.

(Example 2 of Relay Process)

The relay unit 210 relays information that is transmitted and received between in-vehicle ECUs 112 each connected to a CAN bus 22.

More specifically, for example, when the relay unit 210 has received, from a certain in-vehicle ECU 112 via the communication port 122, a CAN frame addressed to an in-vehicle ECU 112 connected to the relay device 200 to which relay unit 210 belongs, the relay unit 210 relays the received CAN frame to the destination in-vehicle ECU 112 via the communication port 122.

When the relay unit 210 has received, from a certain in-vehicle ECU 112 via the communication port 122, a CAN frame addressed to an in-vehicle ECU 112 connected to another relay device 200, the relay unit 210 acquires data from the received CAN frame and generates an Ethernet frame that includes the acquired data. Then, the relay unit 210 relays the generated Ethernet frame to the other relay device 200 via the communication port 121A.

When the relay unit 210 has received, from another relay device 200 via the communication port 121A, an Ethernet frame addressed to an in-vehicle ECU 112 connected to the relay device 200 to which the relay unit 210 belongs, the relay unit 210 acquires data from the received Ethernet frame and generates a CAN frame that includes the acquired data. Then, the relay unit 210 relays the generated CAN frame to the destination in-vehicle ECU 112 via the communication port 122.

(Example 3 of Relay Process)

The relay unit 210 relays information that is transmitted and received between an in-vehicle ECU 111 connected to an Ethernet cable 21 and an in-vehicle ECU 112 connected to a CAN bus 22.

More specifically, for example, when the relay unit 210 has received, from a certain in-vehicle ECU 111 via a corresponding communication port 121, an Ethernet frame addressed to an in-vehicle ECU 112 connected to the relay device 200 to which the relay unit 210 belongs, the relay unit 210 acquires data from the received Ethernet frame and generates a CAN frame that includes the acquired data. Then, the relay unit 210 relays the generated CAN frame to the destination in-vehicle ECU 112 via the communication port 122.

When the relay unit 210 has received, from a certain in-vehicle ECU 112 via the communication port 122, a CAN frame addressed to an in-vehicle ECU 111 connected to the relay device 200 to which the relay unit 210 belongs, the relay unit 210 acquires data from the received CAN frame and generates an Ethernet frame that includes the acquired data. Then, the relay unit 210 relays the generated Ethernet frame to the destination in-vehicle ECU 111 via a corresponding communication port 121.

When the relay unit 210 has received, from a certain in-vehicle ECU 111 via a corresponding communication port 121, an Ethernet frame addressed to an in-vehicle ECU 112 connected to another relay device 200, the relay unit 210 relays the received Ethernet frame to the other relay device 200 via the communication port 121A.

When the relay unit 210 has received, from a certain in-vehicle ECU 112 via the communication port 122, a CAN frame addressed to an in-vehicle ECU 111 connected to another relay device 200, the relay unit 210 acquires data from the received CAN frame and generates an Ethernet frame that includes the acquired data. Then, the relay unit 210 relays the generated Ethernet frame to the other relay device 200 via the communication port 121A.

[Detection Unit]

The detection unit 220 detects at least one of addition of a new function unit and removal of a function unit in the network 12.

More specifically, the detection unit 220 detects a function unit such as an in-vehicle ECU 111, 112, an external device, or an application 101, 102 that is newly added to the network 12, as a new function unit. In addition, when a function unit such as an in-vehicle ECU 111, 112, an external device, or an application 101, 102 has been removed from the network 12, the detection unit 220 detects that the function unit has been removed.

For example, periodically or non-periodically, the detection unit 220 broadcasts, via the relay unit 210, a search message for detecting in-vehicle ECUs 111, 112 in the network 12.

Each in-vehicle ECU 111, 112 in the network 12 receives the search message from the detection unit 220, and transmits, as a response to the received search message, connection information that includes the ID, e.g., the MAC address, of the in-vehicle ECU 111, 112.

The detection unit 220 receives the connection information from the in-vehicle ECU 111, 112 via the relay unit 210, and detects addition of a new in-vehicle ECU 111, 112 and removal of an in-vehicle ECU 111, 112 on the basis of the received connection information.

The in-vehicle ECU 111, 112 that is newly added to the network 12 may be configured to transmit, to the relay device 200, connection request information for requesting communication connection in the network 12.

In this case, the detection unit 220 receives the connection request information via the relay unit 210, and detects the transmission source in-vehicle ECU 111, 112 of the connection request information.

Hereinafter, the network 12 that includes a new function unit and the network 12 from which a function unit has been removed will also be referred to as a new network, and the network 12 before a new function unit is added and the network 12 before a function unit is removed will also be referred to as an existing network.

(Detection Example 1)

Figure 5:
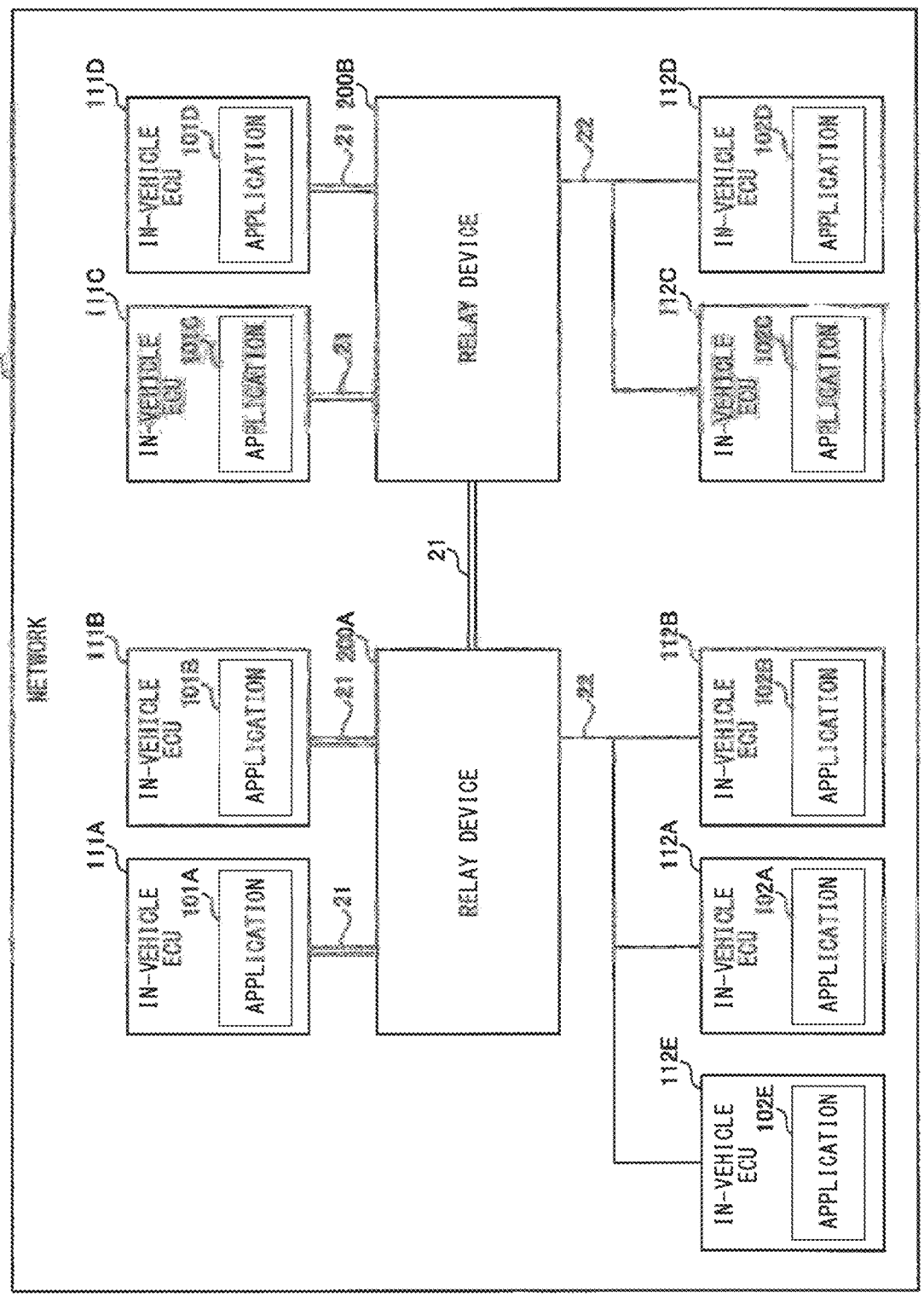
FIG. 5 shows an example of a configuration of a new network in the vehicle communication system according to the embodiment of the present disclosure.

FIG. 5 shows an example of a configuration of a new network in the vehicle communication system according to the embodiment of the present disclosure.

With reference to FIG. 5, assumed is a case where an in-vehicle ECU 112E is connected to a relay device 200 via a CAN bus 22, whereby the in-vehicle ECU 112E is newly added to the network 12. The in-vehicle ECU 112E includes an application 102E.

The in-vehicle ECU 112E is connected to a CAN bus 22 that is connected to the communication port 122 of the relay device 200A, for example.

The in-vehicle ECU 112E receives a search message from the detection unit 220 in the relay device 200A, and transmits, as a response to the received search message, connection information that includes the ID, e.g., the MAC address, of the in-vehicle ECU 112E to the detection unit 220 in the relay device 200A.

More specifically, the in-vehicle ECU 112E generates a CAN frame that includes connection information and transmits the generated CAN frame to the relay device 200A.

When the detection unit 220 in the relay device 200A has received the CAN frame transmitted from the in-vehicle ECU 112E, the detection unit 220 performs an authentication process regarding the in-vehicle ECU 112E by using the ID or the like included in the received CAN frame.

When the detection unit 220 has succeeded in authentication of the in-vehicle ECU 112E, the detection unit 220 generates a CAN frame that is addressed to the in-vehicle ECU 112E and that includes authentication success information indicating that the authentication has been successful, and transmits the generated CAN frame to the in-vehicle ECU 112E via the relay unit 210.

(Detection Example 2)

Figure 6:
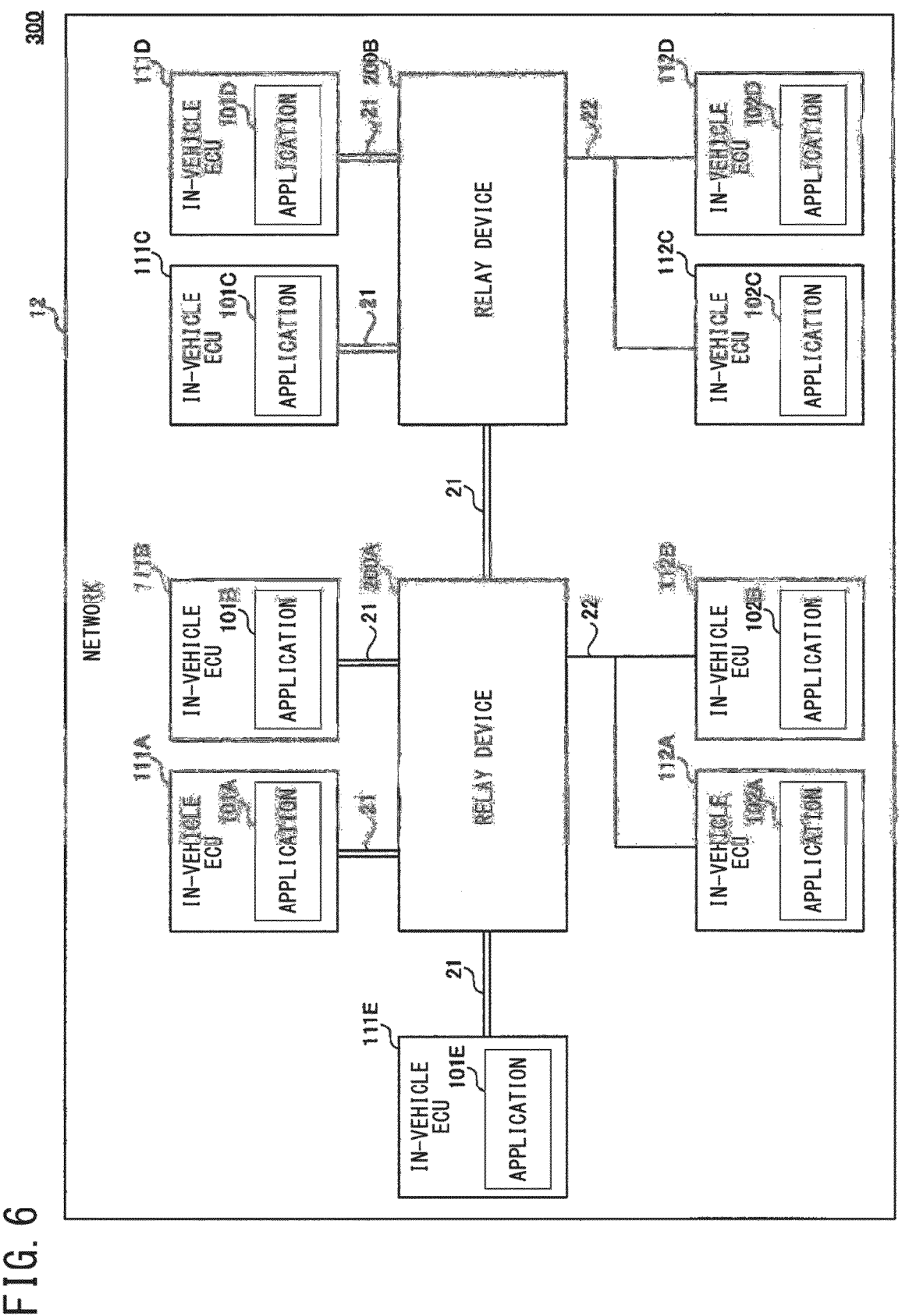
FIG. 6 shows an example of a configuration of a new network in the vehicle communication system according to the embodiment of the present disclosure.

FIG. 6 shows an example of a configuration of a new network in the vehicle communication system according to the embodiment of the present disclosure.

With reference to FIG. 6, assumed is a case where an in-vehicle ECU 111E is connected to a relay device 200 via an Ethernet cable 21, whereby the in-vehicle ECU 111E is newly added to the network 12. The in-vehicle ECU 111E includes an application 101E.

The in-vehicle ECU 111E is connected to the communication port 121D in the relay device 200A via an Ethernet cable 21, for example.

The in-vehicle ECU 111E receives a search message from the detection unit 220 in the relay device 200A, and transmits, as a response to the received search message, connection information that includes the ID, e.g., the MAC address, of the in-vehicle ECU 111E to the detection unit 220 in the relay device 200A.

More specifically, the in-vehicle ECU 111E generates an Ethernet frame that includes connection information and transmits the generated Ethernet frame to the relay device 200A.

When the detection unit 220 in the relay device 200A has received the Ethernet frame transmitted from the in-vehicle ECU 111E, the detection unit 220 performs an authentication process regarding the in-vehicle ECU 111E by using the ID or the like included in the received Ethernet frame.

When the detection unit 220 has succeeded in authentication of the in-vehicle ECU 111E, the detection unit 220 generates an Ethernet frame that is addressed to the in-vehicle ECU 111E and that includes authentication success information indicating that the authentication has been successful, and transmits the generated Ethernet frame to the in-vehicle ECU 111E via the relay unit 210.

When the detection unit 220 has succeeded in authentication of an in-vehicle ECU 111, 112 being a new function unit as described above, the detection unit 220 outputs, to the acquisition unit 230, detection information indicating the ID of the in-vehicle ECU 111, 112.

The new function unit detected by the detection unit 220 is not limited to an in-vehicle ECU 111, 112 that is newly connected to the relay device 200. For example, the detection unit 220 may be configured to detect, as a new function unit, an application 101, 102 that is installed to an in-vehicle ECU 111, 112 in an existing network.

[Acquisition Unit]

With reference to FIG. 3 and FIG. 4 again, the acquisition unit 230 acquires function unit information F1, of each in-vehicle ECU 111 connected to an Ethernet cable 21, that includes information regarding a network configuration of a layer of a lower order than the application layer. The function unit information F1 is an example of first function unit information.

The acquisition unit 230 acquires function unit information F2, of each in-vehicle ECU 112 connected to a CAN bus 22, that includes information regarding a network configuration of a layer of a lower order than the application layer. The function unit information F2 is an example of second function unit information.

More specifically, the acquisition unit 230 acquires function unit information F1 of the in-vehicle ECU 111 and function unit information F2 of the in-vehicle ECU 112 indicated by the detection information received from the detection unit 220, and acquires function unit information F1 of each in-vehicle ECU 111 and function unit information F2 of each in-vehicle ECU 112 in the existing network.

For example, as the function unit information F1, F2, the acquisition unit 230 acquires information that allows recognition of at least one of: information that allows recognition of the topology of the new network and the specifications of hardware devices such as the in-vehicle ECUs 111, 112, the relay devices 200, and the external device in the new network; restriction regarding disposition of the applications 101, 102 in the hardware devices in the new network; and restriction of the communication method in the new network.

As the information that allows recognition of the topology of the new network and the specifications of hardware devices, the acquisition unit 230 acquires at least one type of information from among: for example, information regarding the identifier, the name, the device type indicating a sensor type, a function, etc., the memory size, the number of physical ports provided for each communication protocol, the identifier of each physical port, the power supply configuration, the power consumption, the IDs of VLANs, the subnet address, and the function domain, of each hardware device; information regarding the specification of a CPU (Central Processing Unit) or a GPU (Graphics Processing Unit) installed in each hardware device; information regarding the connection relationship between hardware devices; information regarding the bandwidth of communication between hardware devices; and information regarding the specification of the relay device 200.

As the information that allows recognition of the restriction regarding disposition of the applications 101, 102 in the hardware devices, the acquisition unit 230 acquires at least one type of information from among, for example, pieces of information regarding the calculation speed necessary for execution, the memory use amount, restriction of the OS (Operating System) environment, and restriction of the communication protocol such as TCP (Transmission Control Protocol) and UDP (User datagram Protocol), of each application 101, 102.

As information that allows recognition of the restriction of the communication method in the new network, the acquisition unit 230 acquires at least one type of information from among pieces of information regarding: the communication traffic; presence or absence of support of LAG (Link Aggregation); the communication frequency; necessity or unnecessity of burst transmission; the allowable delay time; the allowable amount of loss; the required security level; operation timing; the communication type indicating, e.g., periodic communication or non-periodic communication; the identifier of the application 101, 102 to serve as a communication counterpart; and the messaging system indicating a request-response type, a publish-subscribe type, or the like, of each application 101, 102; as well as the priority of communication by the application 101, 102.

For example, periodically, each in-vehicle ECU 111 transmits, to the relay device 200, a function unit information frame FA1 being an Ethernet frame that includes a time stamp and function unit information F1 of the in-vehicle ECU 111. The in-vehicle ECU 111 periodically transmits the function unit information frame FA1 to the relay device 200 in accordance with LLDP (Link Layer Discovery Protocol), for example.

For example, the acquisition unit 230 transmits, to each in-vehicle ECU 112 via the relay unit 210, information request notification RA indicating that function unit information F2 should be transmitted.

The in-vehicle ECU 112 transmits, as a response to the information request notification RA received from the acquisition unit 230, a function unit information frame FA2 being a CAN frame that includes a time stamp and function unit information F2 of the in-vehicle ECU 112, to the acquisition unit 230.

For example, the storage unit 260 includes a database of function unit information F1 of one or a plurality of in-vehicle ECUs 111.

When the acquisition unit 230 has received a function unit information frame FA1 from an in-vehicle ECU 111 via the relay unit 210, the acquisition unit 230 acquires function unit information F1 from the received function unit information frame FA1. The acquisition unit 230 registers the acquired function unit information F1 into the database in the storage unit 260 for each in-vehicle ECU 111.

When the acquisition unit 230 has received a function unit information frame FA2 from an in-vehicle ECU 112 via the relay unit 210, the acquisition unit 230 outputs the received function unit information frame FA2 to the conversion unit 240.

[Conversion Unit]

The conversion unit 240 is an example of a generation unit that generates network information that is used in communication according to Ethernet, e.g., function unit information F1, on the basis of network information that is used in communication according to CAN, e.g., function unit information F2.

More specifically, when the conversion unit 240 has received a function unit information frame FA2 from the acquisition unit 230, the conversion unit 240 performs a conversion process of converting the function unit information F2 included in the received function unit information frame FA2 into information that is able to be registered into the database of function unit information F1 in the storage unit 260.

FIG. 7 shows an example of a database in the storage unit of the relay device according to the embodiment of the present disclosure.

With reference to FIG. 7, for example, the function unit information F1 of each in-vehicle ECU 111 connected to the relay device 200A via an Ethernet cable 21 is registered, for each in-vehicle ECU 111, in the database DB in the storage unit 260 of the relay device 200A.

Specifically, for example, as the function unit information F1 of the in-vehicle ECU 111A, the database DB has registered therein "0x04" being the ID of the in-vehicle ECU 111A, "G function" being the function of the in-vehicle ECU 111A, "True" indicating that Ethernet being the communication protocol complied with by the in-vehicle ECU 111A has LAG support, "0x1A" being the ID of the in-vehicle ECU 111C being the data transmission destination of the in-vehicle ECU 111A, and "20" indicating the communication traffic from the in-vehicle ECU 111A to the in-vehicle ECU 111C. "0x" means that the numerical value following "0x" is in the hexadecimal notation.

For example, the function unit information F2 in the function unit information frame FA2 received by the conversion unit 240 from the acquisition unit 230 includes transmission source information indicating the transmission source ID of the function unit information F2, ECU function information indicating the function of the in-vehicle ECU 112 being the transmission source of the function unit information F2, and state information indicating the state of the in-vehicle ECU 112 being the transmission source of the function unit information F2.

The conversion unit 240 converts various types of information included in the function unit information frame FA2 received from the acquisition unit 230 into information that is able to be registered into the database DB, and registers the various types of information after the conversion, into the database DB.

(Example 1 of Conversion Process)

As a conversion process, the conversion unit 240 performs a process of applying an element E2 of function unit information F2 to an element E1 being an element of function unit information F1 and being an element having a definition different from the element E2.

The conversion unit 240 acquires function unit information F2 of the in-vehicle ECU 112A from a function unit information frame FA2 received from the acquisition unit 230.

For example, when the acquired function unit information F2 includes "transmission source ID" as an element E2 in the function unit information F2, the conversion unit 240 performs, as the conversion process, a process of applying "transmission source ID" being an element E2 in the function unit information F2 to an element E1 of ID of the in-vehicle ECU 112A in the function unit information F1.

FIG. 8 shows an example of a database after update in the storage unit of the relay device according to the embodiment of the present disclosure.

With reference to FIG. 8, the conversion unit 240 applies the transmission source ID being an element E2 in the function unit information F2 of the in-vehicle ECU 112A, to the element E1 of ID of the in-vehicle ECU 112 in the function unit information F1, and registers, into the database DB, "0x01" being the value of the transmission source ID in the function unit information F2, as the ID of the in-vehicle ECU 112.

(Example 2 of Conversion Process)

As a conversion process, the conversion unit 240 converts the value of an element E2 of function unit information F2 in accordance with a predetermined rule.

The conversion unit 240 acquires function unit information F2 of the in-vehicle ECU 112A from a function unit information frame FA2 received from the acquisition unit 230.

For example, when the acquired function unit information F2 includes "ECU function information" as an element E2 in the function unit information F2, the conversion unit 240 performs, as the conversion process, a process of converting the function indicated by the ECU function information in the function unit information F2, to a corresponding function in the function unit information F1.

For example, the storage unit 260 has further stored therein a conversion table indicating a correspondence relationship between ECU function information in function unit information F2, and a function defined in the function unit information F2 and a corresponding function in the function unit information F1.

The conversion table is a table that defines a conversion rule being an example of the aforementioned predetermined rule used when the value of an element E2 in function unit information F2 is converted. For example, in accordance with the conversion rule defined by the conversion table, the conversion unit 240 converts the value of an element E2 in function unit information F2 into information that is able to be registered into the database DB.

FIG. 9 shows an example of a conversion table in the storage unit of the relay device according to the embodiment of the present disclosure.

With reference to FIG. 9, a conversion table CT shows that, for example, when ECU function information included in function unit information F2 is "0b00", the function of the in-vehicle ECU 112 defined in the function unit information F2 is "A function" and the corresponding function of the in-vehicle ECU 112 in the function unit information F1 is "D function". "0b" means that the numerical value following "0b" is in binary notation.

When the ECU function information included in the acquired function unit information F2 is "0b01", the conversion unit 240 identifies that the corresponding function, in the function unit information F1, that corresponds to the ECU function information is "D function", on the basis of the conversion table CT in the storage unit 260.

FIG. 10 shows another example of the database after update in the storage unit of the relay device according to the embodiment of the present disclosure.

With reference to FIG. 10, on the basis of the conversion table CT in the storage unit 260, the conversion unit 240 registers, into the database DB, "D function", which corresponds to "0b01" being the ECU function information included in the function unit information F2 of the in-vehicle ECU 112A and which is the corresponding function in the function unit information F1, as the function of the in-vehicle ECU 112.

(Example 3 of Conversion Process)

As a conversion process, the conversion unit 240 acquires, from the storage unit 260, information corresponding to function unit information F2 or information based on function unit information F2.

The conversion unit 240 refers to the header field of a function unit information frame FA2 received from the acquisition unit 230, and identifies that the function unit information frame FA2 is a CAN frame.

For example, the storage unit 260 has stored therein a support information table indicating a communication protocol that has LAG support and a communication protocol that does not have LAG support.

FIG. 11 shows an example of a support table in the storage unit of the relay device according to the embodiment of the present disclosure.

With reference to FIG. 11, for example, a support information table ST indicates that Ethernet has LAG support and CAN does not have LAG support.

When the conversion unit 240 has identified that the function unit information frame FA2 received from the acquisition unit 230 is a CAN frame, the conversion unit 240 recognizes, on the basis of the support information table ST in the storage unit 260, that CAN being the communication protocol complied with by the in-vehicle ECU 112A does not have LAG support.

FIG. 12 shows another example of the database after update in the storage unit of the relay device according to the embodiment of the present disclosure.

With reference to FIG. 12, when the conversion unit 240 has identified, on the basis of the support information table ST in the storage unit 260, that the communication protocol complied with by the in-vehicle ECU 112A does not have LAG support, the conversion unit 240 registers, into the database DB, information to the effect that the communication protocol complied with by the in-vehicle ECU 112A does not have LAG support.

(Example 4 of Conversion Process)

As a conversion process, the conversion unit 240 performs a process of changing the data size of an element E2 in function unit information F2 to a data size of an element E1 being an element of function unit information F1 and being an element corresponding to the element E2.

The conversion unit 240 acquires function unit information F2 of the in-vehicle ECU 112A from a function unit information frame FA2 received from the acquisition unit 230.

For example, when the acquired function unit information F2 includes "transmission source ID" as an element E2 in the function unit information F2 and the value of "transmission source ID" is "0x00000001", the conversion unit 240 performs, as the conversion process, a process of changing the data size of the element E2 in the function unit information F2 to a data size of an element E1 of ID of the in-vehicle ECU 112A in the function unit information F1.

Specifically, with reference to FIG. 7 again, the database DB has registered therein "0x04", which is 1 byte information indicating the ID of the in-vehicle ECU 111A.

When "0x00000001" being a 4 byte value is included as the transmission source ID in the acquired function unit information F2, the conversion unit 240 changes, as the conversion process, the value of the transmission source ID to "0x01" being a 1 byte value.

With reference to FIG. 8 again, the conversion unit 240 applies the transmission source ID being an element E2 in the function unit information F2 of the in-vehicle ECU 112A to an element E1 of ID of the in-vehicle ECU 112 in the function unit information F1, and registers, into the database DB, "0x01" being the value of the transmission source ID after the change of the data size, as the ID of the in-vehicle ECU 112.

As for the changing process, the conversion unit 240 may not necessarily be configured to decrease the data size of the element E2 of the function unit information F2, but may be configured to increase the data size of the element E2 of the function unit information F2.

(Update of Database)

For example, the conversion unit 240 acquires function unit information F2 of the in-vehicle ECU 112A from a function unit information frame FA2 received from the acquisition unit 230, and removes function unit information F2 registered in the database DB, on the basis of the acquired function unit information F2.

More specifically, the conversion unit 240 acquires function unit information F2 of the in-vehicle ECU 112A from a function unit information frame FA2 received from the acquisition unit 230.

For example, when the acquired function unit information F2 includes, as an element E2 in the function unit information F2, state information indicating the state of the in-vehicle ECU 112 being the transmission source of the function unit information F2, the conversion unit 240 removes function unit information F2 registered in the database DB, on the basis of the state information.

Specifically, when the function unit information F2 of the in-vehicle ECU 112A includes state information indicating "passive", the conversion unit 240 stores the time stamp included in the function unit information frame FA2, into the storage unit 260.

Then, with reference to the time stamp in the storage unit 260, when a predetermined time has elapsed from the reception of the function unit information frame FA2 that includes the state information indicating "passive", the conversion unit 240 removes function unit information F2 of the in-vehicle ECU 112A registered in the database DB.

[Provision Unit]

The provision unit 250 in the relay device 200A transmits, to the relay device 200B, function unit information F1 and function unit information F2 on the basis of the database DB in the storage unit 260.

The relay device 200A transmits, to the relay device 200B, each piece of function unit information F1 and each piece of function unit information F2 that are registered in the database DB in the storage unit 260 of the relay device 200A, in accordance with SNMP (Simple Network Management Protocol), for example.

With reference to FIG. 2 and FIG. 3 again, for example, the acquisition unit 230 in the relay device 200B transmits, to the relay device 200A via the relay unit 210, an information request notification RB indicating that function unit information should be transmitted.

Upon receiving the information request notification RB from the relay device 200B via the communication port 121A, the relay unit 210 in the relay device 200A outputs the received information request notification RB to the provision unit 250.

Upon receiving the information request notification RB from the relay unit 210, the provision unit 250 acquires each piece of function unit information F1 and each piece of function unit information F2 that are registered in the database DB in the storage unit 260, and transmits each piece of function unit information F1 and each piece of function unit information F2 that have been acquired, to the relay device 200B via the relay unit 210.

The provision unit 250 in the relay device 200A may be configured to, periodically or non-periodically, acquire each piece of function unit information F1 and each piece of function unit information F2 that are registered in the database DB in the storage unit 260 and transmit each piece of function unit information F1 and each piece of function unit information F2 that have been acquired, to the relay device 200B via the relay unit 210.

In this case, when the relay unit 210 in the relay device 200B has received each piece of function unit information F1 and each piece of function unit information F2 from the relay device 200A via the communication port 121A, the relay unit 210 in the relay device 200B outputs, to the acquisition unit 230, each piece of function unit information F1 and each piece of function unit information F2 that have been received.

When the acquisition unit 230 in the relay device 200B has acquired each piece of function unit information F1 and each piece of function unit information F2 from the relay unit 210, the acquisition unit 230 in the relay device 200B updates the database DB in the storage unit 260 by using each piece of function unit information F1 and each piece of function unit information F2 that have been acquired. Specifically, by using each piece of function unit information F1 and each piece of function unit information F2 that have been acquired, the acquisition unit 230 performs: addition of each piece of function unit information F1 and each piece of function unit information F2 into the database DB; change and removal of each piece of function unit information F1 and each piece of function unit information F2 that are registered in the database DB; and the like.

[Update Unit]

The update unit 270 in the relay device 200B updates configuration information of the network 12 that includes one or a plurality of in-vehicle ECUs 111 each connected to an Ethernet cable 21 and one or a plurality of in-vehicle ECUs 112 each connected to a CAN bus 22. The update unit 270 is an example of a management unit.

The update unit 270 generates, on the basis of the database DB in the storage unit 260, configuration information indicating setting contents of the relay devices 200 and in-vehicles ECU 111, 112 for performing communication in a new network.

More specifically, when the database DB in the storage unit 260 has been updated by the acquisition unit 230 or the conversion unit 240, the update unit 270 generates configuration information that indicates setting contents of the relay devices 200 and in-vehicle ECUs 111, 112 for allowing the relay devices 200 and the in-vehicle ECUs 111, 112 to perform communication of a layer 4 or a lower layer in an OSI (Open Systems Interconnection) reference model in a new network, on the basis of each piece of function unit information F1 and each piece of function unit information F2 that are registered in the database DB after the update and in consideration of a logical configuration and a physical configuration of the new network.

(Update Example 1)

With reference to FIG. 5 again, for example, assumed is a case where the database DB in the storage unit 260 of the relay device 200B has been updated by each piece of function unit information F1 and each piece of function unit information F2 in a new network in which the in-vehicle ECU 112E has been connected to the relay device 200A via a CAN bus 22.

For example, on the basis of each piece of function unit information F1 and each piece of function unit information F2 in the database DB after the update, the update unit 270 recognizes communication paths to be used in communication that should be newly performed in the new network to which the in-vehicle ECU 112E has been added, and the communication traffic in each communication path in the new network.

FIG. 13 shows an example of communication that should be newly performed in a new network according to the embodiment of the present disclosure. FIG. 13 shows communication paths to be used in communication that should be newly performed in the new network to which the in-vehicle ECU 112E has been added, and the communication traffic in each communication path in the new network.

With reference to FIG. 13, on the basis of each piece of function unit information F1 and each piece of function unit information F2 in the database DB after the update, the update unit 270 recognizes that when, among communications in communication paths R11, R12, R13, communications in the communication paths R11, R13 that require relay between the relay device 200A and the relay device 200B are started, the communication traffic between the relay device 200A and the relay device 200B increases by 20.

In the following, the upper limit of the band usable amount between the relay device 200A and the relay device 200B is assumed to be 100. In addition, for example, the band use amount between the relay device 200A and the relay device 200B in the existing network shown in FIG. 5 is assumed to be 70.

When communications in the communication paths R11, R13 have been started, whereby the communication traffic between the relay device 200A and the relay device 200B has increased by 20, the total of the band use amounts in the relay device 200A and the relay device 200B in the new network becomes 90, which is not greater than 100 serving as the upper limit value. Therefore, the update unit 270 determines that communications in the communication paths R11, R13 can be performed.

Then, the update unit 270 generates configuration information indicating various setting contents of the relay devices 200 and the in-vehicle ECUs 111, 112 for newly performing communications in the communication paths R11, R12, R13 in the new network.

The update unit 270 outputs the generated configuration information to the notification unit 280, and registers the generated configuration information into the storage unit 260.

Upon receiving the configuration information from the update unit 270, the notification unit 280 notifies, on the basis of the received configuration information, at least one of the relay device 200A and the in-vehicle ECUs 111, 112 in the new network of the setting content for performing communication in the new network.

For example, on the basis of the configuration information received from the update unit 270, the notification unit 280 notifies the relay device 200A and the in-vehicle ECUs 111A, 111C, 112C, 112E for which setting change is necessary, of the setting contents. When there is no in-vehicle ECU 111, 112 for which setting change is necessary in the new network, the notification unit 280 does not perform notification of setting contents to the relay device 200A and the in-vehicle ECUs 111, 112, for example.

Upon being notified of the setting contents from the notification unit 280, the relay device 200A and the in-vehicle ECUs 111A, 111C, 112C, 112E in the new network perform various setting changes in accordance with the notified setting contents. The relay device 200B performs various setting changes on the basis of the generated configuration information. The relay devices 200 and the in-vehicle ECUs 111, 112 in the new network perform communication with each other in accordance with the setting contents after the change.

(Update Example 2)

Figure 14:
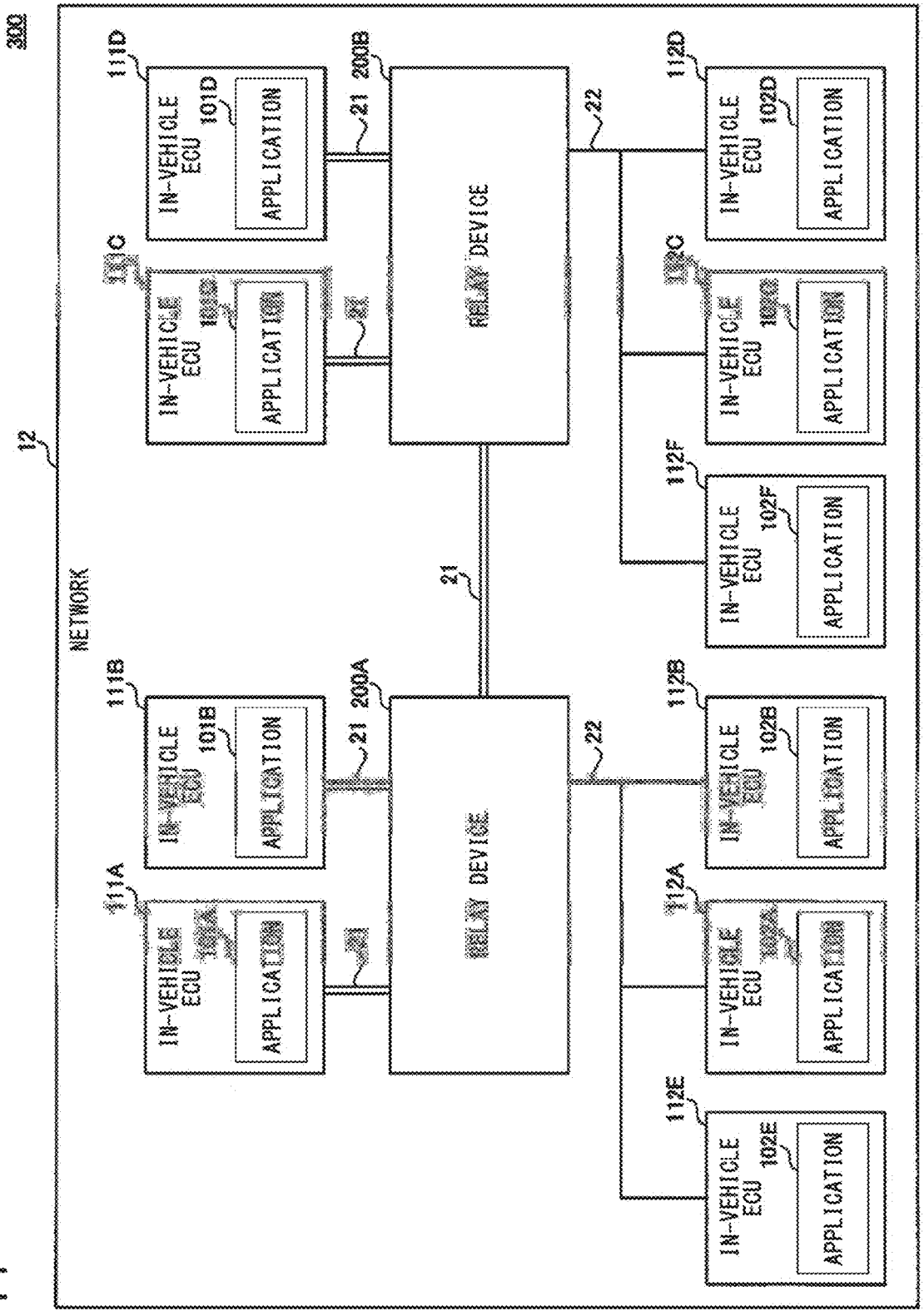
FIG. 14 shows another example of the configuration of a new network in the vehicle communication system according to the embodiment of the present disclosure.

FIG. 14 shows another example of the configuration of a new network in the vehicle communication system according to the embodiment of the present disclosure.

With reference to FIG. 14, the following case is assumed. That is, as a result of an in-vehicle ECU 112F having been connected to the relay device 200B via a CAN bus 22 in the network 12 shown in FIG. 5, the in-vehicle ECU 112F is newly added to the network 12, and the database DB in the storage unit 260 of the relay device 200B is updated by each piece of function unit information F1 and each piece of function unit information F2 in the new network to which the in-vehicle ECU 112F has been added. The in-vehicle ECU 112F includes an application 102F.

For example, on the basis of each piece of function unit information F1 and each piece of function unit information F2 in the database DB after the update, the update unit 270 recognizes communication paths to be used in communication that should be newly performed in the new network to which the in-vehicle ECU 112F has been added, and the communication traffic in each communication path in the new network.

FIG. 15 shows another example of communication that should be newly performed in a new network according to the embodiment of the present disclosure. FIG. 15 shows communication paths to be used in communication that should be newly performed in the new network to which the in-vehicle ECU 112F has been added, and the communication traffic in each communication path in the new network.

With reference to FIG. 15, on the basis of each piece of function unit information F1 and each piece of function unit information F2 in the database DB after the update, the update unit 270 recognizes that when, among communications in communication paths R14, R15, communication in the communication path R15 that requires relay between the relay device 200A and the relay device 200B is started, the band use amount between the relay device 200A and the relay device 200B increases by 20.

Here, as described above, the band use amount between the relay device 200A and the relay device 200B in the network 12 shown in FIG. 5 is 90.

When communication in the communication path R15 has been started, whereby the band use amount between the relay device 200A and the relay device 200B has increased by 20, the total of the band use amounts between the relay device 200A and the relay device 200B in the new network becomes 110, which exceeds 100 serving as the upper limit value. Therefore, the update unit 270 determines that communication using the communication path R15 cannot be performed.

Then, the update unit 270 generates configuration information indicating various setting contents of the relay devices 200 and the in-vehicle ECUs 111, 112 for newly performing communication in the communication path R14 in the new network. In addition, the update unit 270 registers communication using the communication path R15 as suspension communication, into the storage unit 260.

The update unit 270 outputs the generated configuration information to the notification unit 280, and registers the generated configuration information into the storage unit 260.

(Update Example 3)

Figure 16:
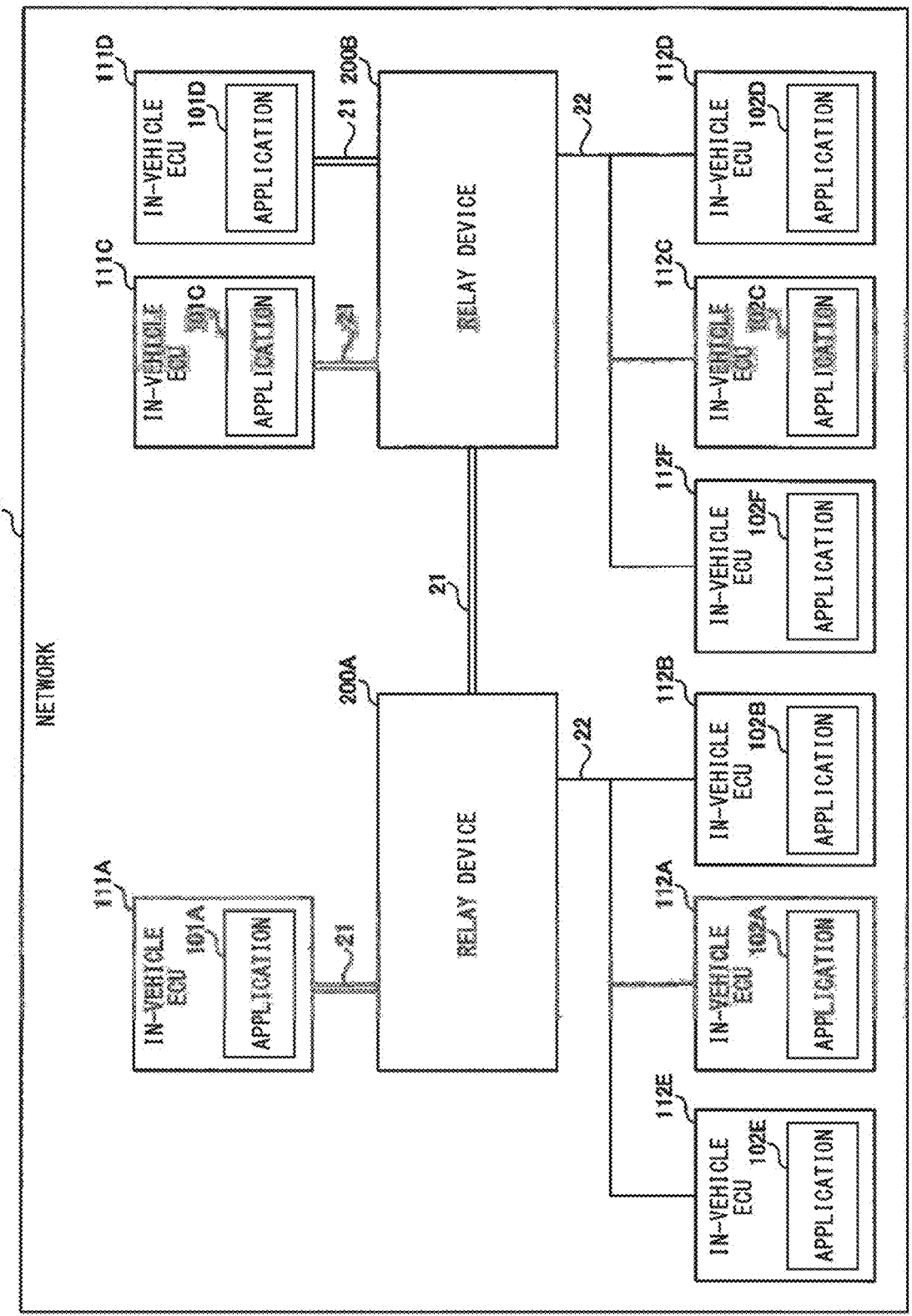
FIG. 16 shows another example of the configuration of a new network in the vehicle communication system according to the embodiment of the present disclosure.

FIG. 16 shows another example of the configuration of a new network in the vehicle communication system according to the embodiment of the present disclosure.

With reference to FIG. 16, assumed is a case where the in-vehicle ECU 111B has been removed from the network 12 shown in FIG. 14 and the database DB in the storage unit 260 of the relay device 200B has been updated by each piece of function unit information F1 and each piece of function unit information F2 in the new network after the removal.

For example, on the basis of each piece of function unit information F1 and each piece of function unit information F2 in the database DB after the update, the update unit 270 recognizes communication paths having been used in communication that is stopped in the new network from which the in-vehicle ECU 111B has been removed, and the communication traffic in each communication path in the new network.

FIG. 17 shows an example of communication stopped in a new network according to the embodiment of the present disclosure. FIG. 17 shows communication paths, in the new network from which the in-vehicle ECU 111B has been removed, that have been used in communications that are stopped due to the removal of the in-vehicle ECU 111B, and the communication traffic in each communication path in the new network.

With reference to FIG. 17, on the basis of each piece of function unit information F1 and each piece of function unit information F2 in the database DB after the update, the update unit 270 recognizes that when communications between communication paths R1, R2 that require relay between the relay device 200A and the relay device 200B are stopped, the band use amount between the relay device 200A and the relay device 200B decreases by 30.

Here, as described above, the band use amount between the relay device 200A and the relay device 200B in the network 12 shown in FIG. 14 is 90.

The update unit 270 recognizes that when communications in the communication paths R1, R2 have been stopped, whereby the band use amount between the relay device 200A and the relay device 200B has decreased by 30, the total of the band use amounts between the relay device 200A and the relay device 200B in the new network becomes 60.

In addition, when communication in the communication path R15, which is the suspension communication registered in the storage unit 260, has been started, whereby the band use amount between the relay device 200A and the relay device 200B has increased by 20, the total of the band use amounts between the relay device 200A and the relay device 200B in the new network becomes 80, which is not greater than 100 as the upper limit value. Therefore, the update unit 270 determines that communication in the communication path R15 can be performed.

Then, the update unit 270 generates configuration information indicating various setting contents of the relay devices 200 and the in-vehicle ECUs 111, 112 for newly performing communication in the communication path R15 in the new network, with communications in the communication path R1, R2 stopped.

The update unit 270 outputs the generated configuration information to the notification unit 280 and registers the generated configuration information into the storage unit 260.

[Operation Flow]

Each device in the communication system according to the embodiment of the present disclosure includes a computer that includes a memory. An arithmetic processing unit such as a CPU in the computer reads out, from the memory, a program including a part or all of steps in the flow chart and sequence shown below, and executes the program. Programs of the plurality of devices can each be installed from outside. The programs of the plurality of devices are each distributed in a state of being stored in a storage medium.

Figure 18:
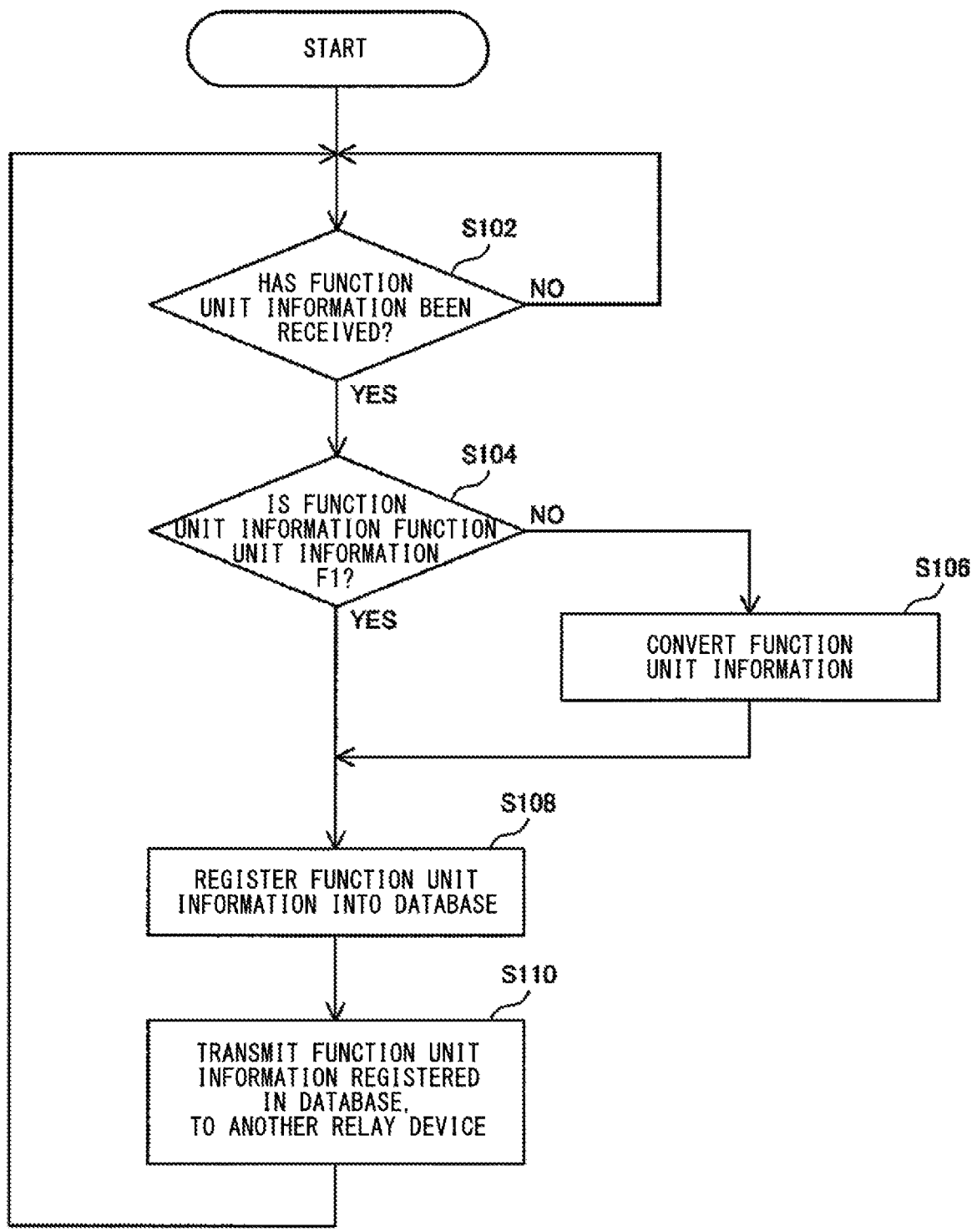
FIG. 18 is a flow chart describing an operation procedure according to which a relay device provides function unit information to another relay device in the vehicle communication system according to the embodiment of the present disclosure.

FIG. 18 is a flow chart describing an operation procedure according to which a relay device provides function unit information to another relay device in the vehicle communication system according to the embodiment of the present disclosure.

With reference to FIG. 18, first, the relay device 200A waits for function unit information from an in-vehicle ECU 111, 112 in the network 12 (NO in step S102). When the relay device 200A has received function unit information (YES in step S102), the relay device 200A determines whether or not the received function unit information is function unit information F1 of an in-vehicle ECU 111 connected to an Ethernet cable 21 (step S104).

When the received function unit information is function unit information F1 (YES in step S104), the relay device 200A registers the received function unit information F1 into the database DB in the storage unit 260 (step S108).

Meanwhile, when the received function unit information is not function unit information F1, e.g., when the received function unit information is function unit information F2 of an in-vehicle ECU 112 connected to a CAN bus 22 (NO in step S104), the relay device 200A converts the received function unit information F2 into information that is able to be registered into the database DB of function unit information F1 in the storage unit 260 (step S106).

Next, the relay device 200A registers the function unit information F2 after the conversion into the database DB (step S108).

Next, the relay device 200A acquires each piece of function unit information F1 and each piece of function unit information F2 that are registered in the database DB, and transmits each piece of function unit information F1 and each piece of function unit information F2 that have been acquired, to the relay device 200B (step S110).

Next, the relay device 200A waits for function unit information from an in-vehicle ECU 111, 112 in the network 12 (NO in step S102).

Figure 19:
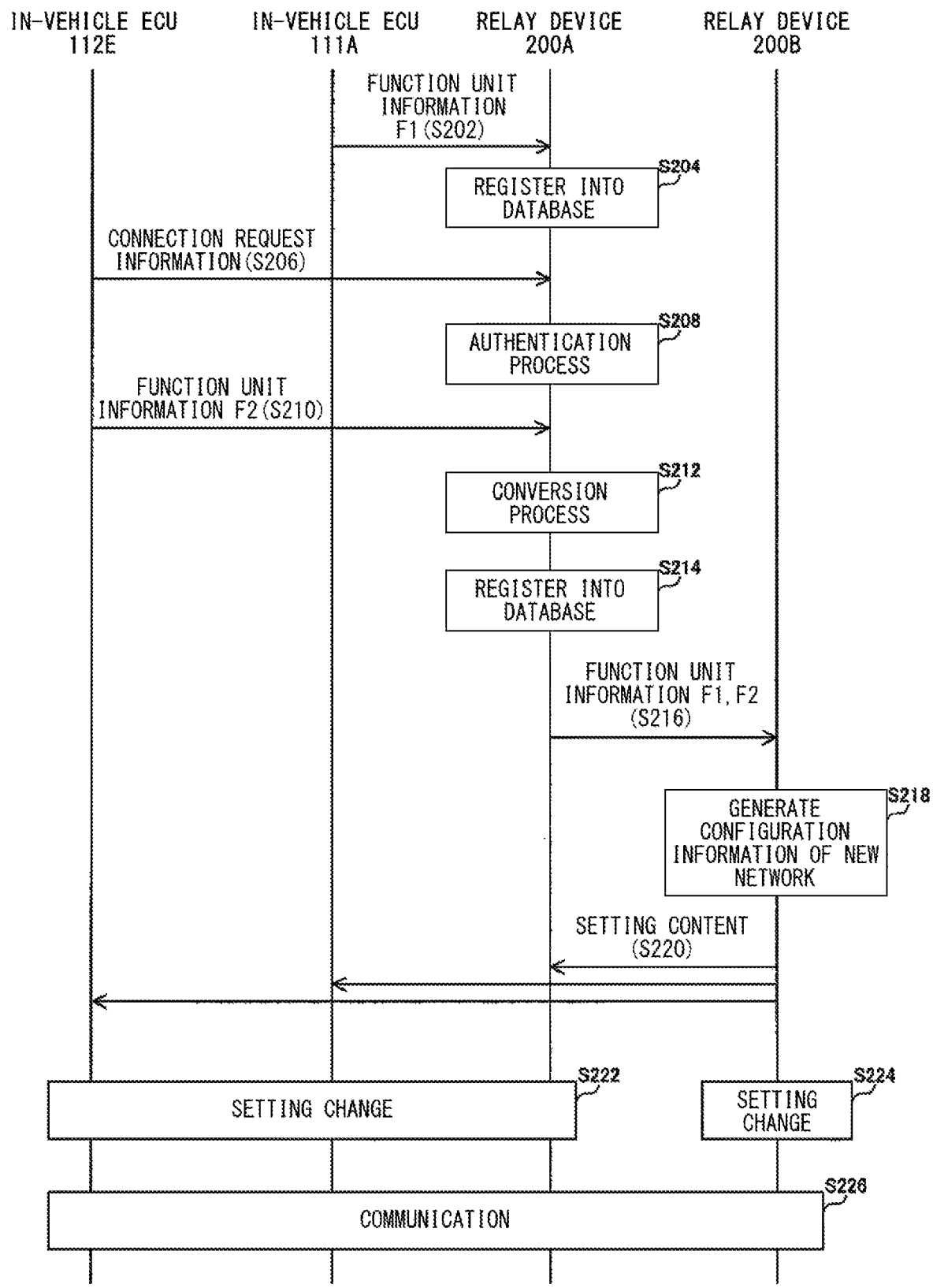
FIG. 19 shows an example of a sequence of a construction process of a new network in the vehicle communication system according to the embodiment of the present disclosure.

FIG. 19 shows an example of a sequence of a construction process of a new network in the vehicle communication system according to the embodiment of the present disclosure.

With reference to FIG. 19, first, the in-vehicle ECU 111A connected to the relay device 200A via an Ethernet cable 21 transmits function unit information F1 of the in-vehicle ECU 111A to the relay device 200A (step S202).

Next, the relay device 200A registers the function unit information F1 received from the in-vehicle ECU 111A into the database DB in the storage unit 260 (step S204).

Next, the in-vehicle ECU 112E that is newly added to the network 12 by being connected to the relay device 200A via a CAN bus 22 transmits connection request information to the relay device 200A (step S206).

Next, the relay device 200A receives the connection request information from the in-vehicle ECU 112E, thereby detecting the in-vehicle ECU 112E, and performs an authentication process regarding the in-vehicle ECU 112E (step S208).

Next, the in-vehicle ECU 112E transmits function unit information F2 thereof to the relay device 200A (step S210).

Next, the relay device 200A converts the function unit information F2 received from the in-vehicle ECU 112E into information that is able to be registered into the database DB of function unit information F1 in the storage unit 260 (step S212).

Next, the relay device 200A registers the function unit information F2 after the conversion into the database DB (step S214).

Next, the relay device 200A acquires each piece of function unit information F1 and each piece of function unit information F2 that are registered in the database DB in the storage unit 260 of the relay device 200A, and transmits each piece of function unit information F1 and each piece of function unit information F2 that have been acquired, to the relay device 200B (step S216).

Next, the relay device 200B generates configuration information of a new network on the basis of each piece of function unit information F1 and each piece of function unit information F2 that are registered in the database DB in the storage unit 260 of the relay device 200B, and each piece of function unit information F1 and each piece of function unit information F2 that have been received from the relay device 200A (step S218).

Next, on the basis of the generated configuration information, the relay device 200B notifies the relay device 200A and the in-vehicle ECUs 111A, 112E of the setting contents (step S220).

Next, the relay device 200A and the in-vehicle ECUs 111A, 112E perform various setting changes in accordance with the setting contents notified of by the relay device 200B (step S222).

In addition, the relay device 200B performs various setting changes on the basis of the generated configuration information (step S224).

Next, the relay devices 200A, 200B and the in-vehicle ECUs 111A, 112E in the new network perform communication with each other in accordance with the setting contents after the change (step S226).

In the relay device 200 according to the embodiment of the present disclosure, the conversion unit 240 performs, as the conversion process, Examples 1, 2, 3, 4 of the conversion process described above. However, the present disclosure is not limited thereto. The conversion unit 240 may be configured not to perform a part or all of Examples 1, 2, 3, 4 of the conversion process. The conversion unit 240 may be configured to perform a conversion process other than Examples 1, 2, 3, 4 of the conversion process.

In the relay device 200 according to the embodiment of the present disclosure, the conversion unit 240 registers function unit information F2 after conversion, into the database DB. However, the present disclosure is not limited thereto. The conversion unit 240 may be configured to transmit function unit information F2 after conversion to another relay device 200 via, for example, the relay unit 210, without registering the function unit information F2 after conversion into the database DB.

In the relay device 200 according to the embodiment of the present disclosure, the conversion unit 240 converts function unit information F2 into information that is able to be registered into the database DB in the storage unit 260 of the relay device 200. However, the present disclosure is not limited thereto. The relay device 200 may be configured not to be provided with the storage unit 260 including the database DB. The conversion unit 240 may be configured to convert function unit information F2 into information that is able to be registered into a database in a device other than the relay device 200.

In the relay device 200 according to the embodiment of the present disclosure, the conversion unit 240 removes function unit information F2 registered in the database DB, on the basis of function unit information F2 acquired from a function unit information frame FA2. However, the present disclosure is not limited thereto. The conversion unit 240 may be configured to remove function unit information F2 registered in the database DB, on the basis of information other than function unit information F2.

In the vehicle communication system 300 according to the embodiment of the present disclosure, the relay device 200B includes the update unit 270 and the notification unit 280. However, the present disclosure is not limited thereto. The relay device 200B may be configured not to be provided with the update unit 270 and the notification unit 280. In this case, for example, function unit information F1 and function unit information F2 after conversion may be used in abnormality detection or failure detection of the in-vehicle ECU 111, 112 in the network 12. Alternatively, a device other than the relay devices 200A, 200B may include the update unit 270 and the notification unit 280.

Meanwhile, in a system including a plurality of in-vehicle networks, a technology that enables easy use of information regarding the network configuration of function units connected to different types of transmission paths, is desired.

For example, in recent years, in association with prevalence of car sharing and a desire for improvement of processing capacities of in-vehicle devices installed in vehicles, there is a demand for customization of an in-vehicle network through addition of applications to the in-vehicle network. Thus, there is a demand for a technology that allows addition or removal of various applications with respect to an in-vehicle network in accordance with needs of a user.

When an application is added to or removed from an in-vehicle network to construct a new network, there are cases where communication required by a higher order layer cannot be realized due to the network configuration and restriction of a lower order layer.

Therefore, in a system including a plurality of in-vehicle networks, in order to flexibly construct a network having a new configuration, a technology that allows easy acquisition of information regarding a network configuration and useable in construction of a network, is desired.

In this regard, in the relay device 200 according to the embodiment of the present disclosure, the acquisition unit 230 acquires function unit information F2 of an in-vehicle ECU 112 connected to a CAN bus 22, the function unit information F2 being function unit information that includes information regarding the network configuration of a layer of a lower order than the application layer. The conversion unit 240 performs a conversion process of converting the function unit information F2 acquired by the acquisition unit 230 into information that is able to be registered into the database DB of function unit information F1 of one or a plurality of in-vehicle ECUs 111 each connected to a corresponding Ethernet cable 21.

Thus, with this configuration in which the conversion process of converting the function unit information F2 of the in-vehicle ECU 112 connected to the CAN bus 22 into information that is able to be registered into the database DB of function unit information F1 of in-vehicle ECUs 111 connected to Ethernet cables 21 is performed, the function unit information F2 after the conversion can be registered into the database DB, and the function unit information F2 can be referred to and used, similar to the function unit information F1.

Therefore, in the relay device 200 according to the embodiment of the present disclosure, information regarding the network configuration of function units connected to different types of transmission paths can be easily used.

In the relay device 200 according to the embodiment of the present disclosure, in the conversion process, a process of applying an element E2 of the function unit information F2 to an element E1 being an element of function unit information F1 and being an element having a definition different from that of the element E2, is performed.

With this configuration, the element E2 of the function unit information F2 can be replaced with an element E1 of the function unit information F1, and the value of the element E2 in the function unit information F2 can be referred to and used as the value of the element E1 of the function unit information F1.

In the relay device 200 according to the embodiment of the present disclosure, the conversion process includes a process of converting the value of the element E2 of the function unit information F2 in accordance with a predetermined rule.

With this configuration, the value, of the element E2 of the function unit information F2, converted in accordance with the predetermined rule can be referred to and used as the value of the element E1 of the function unit information F1.

In the relay device 200 according to the embodiment of the present disclosure, the conversion process includes a process of acquiring, from the storage unit 260, information corresponding to the function unit information F2 or information based on the function unit information F2.

With this configuration, the information corresponding to the function unit information F2 or the information based on the function unit information F2 in the storage unit 260 can be referred to and used as the function unit information F1.

In the relay device 200 according to the embodiment of the present disclosure, the conversion process includes a process of changing the data size of an element E2 of the function unit information F2 to a data size of an element E1 being an element of the function unit information F1 and being an element corresponding to the element E2.

With this configuration, the element E2 of the function unit information F2 after the data size has been changed can be referred to and used as an element E1 of the function unit information F1.

In the relay device 200 according to the embodiment of the present disclosure, the conversion unit 240 further performs, on the basis of the function unit information F2 acquired by the acquisition unit 230, at least one of registration of the function unit information F2 after the conversion process into the database DB, and removal of function unit information F2 registered in the database DB.

With this configuration, the database DB can be flexibly updated on the basis of the content of the function unit information F2.

In the relay device 200 according to the embodiment of the present disclosure, the provision unit 250 provides, on the basis of the database DB, the function unit information F2 having been converted by the conversion unit 240, to the update unit 270 that updates configuration information of the network 12 including one or a plurality of in-vehicle ECUs 111 each connected to a corresponding Ethernet cable 21 and one or a plurality of in-vehicle ECUs 112 each connected to a corresponding CAN bus 22.

With this configuration, the function unit information F2 after the conversion can be used in construction of a network for which the network configuration and restriction of a layer of a lower order than the application layer are taken into consideration.

In the relay device 200 according to the embodiment of the present disclosure, the relay unit 210 performs first communication being communication according to a first communication protocol, and second communication being communication according to a second communication protocol. On the basis of network information that is used in the second communication, the conversion unit 240 generates network information to be used in the first communication.

Thus, with this configuration in which network information to be used in the first communication is generated on the basis of network information that is used in the second communication, two types of network information that are used in communication via different types of transmission paths, for example, can be registered into the same database. Therefore, the two types of network information can be referred to and used.

Therefore, in the relay device 200 according to the embodiment of the present disclosure, information regarding the network configuration of function units connected to different types of transmission paths can be easily used.

In the relay device 200 according to the embodiment of the present disclosure, the first communication protocol is Ethernet, and the second communication protocol is CAN.

With this configuration, in a network in which communication according to Ethernet and communication according to CAN are performed, network information that is used in communication according to Ethernet and network information that is used in communication according to CAN can be registered into the same database.

The vehicle 1 according to the embodiment of the present disclosure includes the relay device 200.

With this configuration, in the vehicle 1 including the relay device 200, information regarding the network configuration of function units connected to different types of transmission paths can be easily used.

A communication method according to the embodiment of the present disclosure is a communication method to be performed in a relay device 200 that relays information transmitted and received between an in-vehicle ECU 111 connected to an Ethernet cable 21 and an in-vehicle ECU 112 connected to a CAN bus 22. In this communication method, first, the relay device 200 acquires function unit information F2, of an in-vehicle ECU 112 connected to a CAN bus 22, that includes information regarding the network configuration of a layer of a lower order than an application layer. Next, the relay device 200 performs a conversion process of converting the acquired function unit information F2 into information that is able to be registered into the database DB of one or a plurality of pieces of function unit information F1, of one or a plurality of in-vehicle ECUs 111 each connected to a corresponding Ethernet cable 21, that includes information regarding the network configuration of a layer of a lower order than the application layer.

Thus, with the method in which the conversion process of converting the function unit information F2 of the in-vehicle ECU 112 connected to a CAN bus 22 into information that is able to be registered into the database DB of function unit information F1 of the in-vehicle ECUs 111 connected to Ethernet cables 21 is performed, the function unit information F2 after the conversion can be registered into the database DB, and the function unit information F2 can be referred to and used, similar to the function unit information F1.

Therefore, in the communication method according to the embodiment of the present disclosure, information regarding the network configuration of function units connected to different types of transmission paths can be easily used.

The above embodiment is merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A relay device installed in a vehicle, the relay device comprising:

a relay unit configured to relay information that is transmitted and received between an in-vehicle ECU connected to an Ethernet cable and an in-vehicle ECU connected to a CAN bus;

an acquisition unit configured to acquire second function unit information of the in-vehicle ECU connected to the CAN bus, the second function unit information being function unit information that includes information regarding a network configuration of a layer of a lower order than an application layer; and a conversion unit configured to perform a conversion process of converting the second function unit information acquired by the acquisition unit, so as to be able to be registered into a database of one or a plurality of pieces of first function unit information being function unit information of one or a plurality of the in-vehicles ECU each connected to a corresponding Ethernet cable.

[Additional Note 2]

A communication method to be used in a relay device configured to perform first communication being communication according to a first communication protocol, and second communication being communication according to a second communication protocol, the communication method comprising the steps of:

receiving network information that is used in the second communication; and generating, on the basis of the received network information, network information to be used in the first communication.

[Additional Note 3]

A communication program to be used in a relay device installed in a vehicle, the communication program being for causing a computer to function as:

a communication unit configured to perform first communication being communication according to a first communication protocol, and second communication being communication according to a second communication protocol; and a generation unit configured to generate, on the basis of network information that is used in the second communication, network information to be used in the first communication.

REFERENCE SIGNS LIST 1 vehicle
21 Ethernet cable (first transmission path)
22 CAN bus (second transmission path)
12 network
101, 102 application
111 in-vehicle ECU
112 in-vehicle ECU
161 wireless base station device
170 external network
180 server
200 relay device
210 relay unit (communication unit)
220 detection unit
230 acquisition unit
240 conversion unit (generation unit)
250 provision unit
260 storage unit
270 update unit (management unit)
280 notification unit
300 vehicle communication system
400 communication system

The invention claimed is:

1. A relay device installed in a vehicle and configured to relay information transmitted and received between a first function unit connected to a first transmission path and a second function unit connected to a second transmission path, the relay device comprising:

a detection unit configured to detect addition, to an in-vehicle network, of a first new function unit that is the first function unit capable of communicating in a first communication network, or addition, to the in-vehicle network, of a second new function unit that is the second function unit capable of communicating in a second communication network;

an acquisition unit configured to:
in response to a detection of the addition of the first new function unit to the in-vehicle network, acquire, from the first new function unit, first function unit information of the first function unit, the first function unit information including information regarding a first network configuration of a layer of a lower order than an application layer; and
in response to a detection of the addition of the second new function unit to the in-vehicle network, acquire, from the second new function unit, second function unit information of the second function unit, the second function unit information including information regarding a second network configuration of the layer of the lower order than the application layer; and a conversion unit configured to perform, in response to the detection of the addition of the second new function unit to the in-vehicle network, a conversion process of converting the second function unit information acquired by the acquisition unit into information that is able to be registered into a database of one or a plurality of pieces of first function unit information of one or a plurality of the first function units, wherein the conversion process is a process of converting a plurality of elements included in the second function unit information into a plurality of elements included in the first function unit information, the plurality of elements included in the first function unit information including an ID of the function unit, a function of the function unit, an availability of LAG support, an ID of a function unit of a data transmission destination, and communication traffic.

2. The relay device according to claim 1, wherein
the conversion process includes a process of applying a second element of the second function unit information to a first element of the first function unit information and having a definition different from that of the second element.

3. The relay device according to claim 1, wherein
the conversion process includes a process of converting a value of an element of the second function unit information in accordance with a predetermined rule.

4. The relay device according to claim 1, wherein
the relay device further includes a storage unit, and
the conversion process includes a process of acquiring, from the storage unit, information corresponding to the second function unit information or information based on the second function unit information.

5. The relay device according to claim 1, wherein
the conversion process includes a process of changing a data size of a second element of the second function unit information to a data size of a first element of the first function unit information and corresponding to the second element.

6. The relay device according to claim 1, wherein
based on the second function unit information acquired by the acquisition unit, the conversion unit further performs at least one of registration of the second function unit information after the conversion process into the database, and removal of the second function unit information registered in the database.

7. The relay device according to claim 1, wherein the relay device further includes
a provision unit configured to provide, based on the database, the second function unit information having been converted by the conversion unit, to a management unit configured to update configuration information of a network including one or a plurality of first function units each connected to a corresponding first transmission path and one or a plurality of second function units each connected to a corresponding second transmission path.

8. The relay device according to claim 1, wherein
the first function unit information and the second function unit information are each at least one of pieces of information regarding a calculation speed necessary for execution, a memory use amount, restriction of an OS (Operating System) environment, a communication traffic, a communication frequency, necessity or unnecessity of burst transmission, an allowable delay time, an allowable amount of loss, an operation timing, and a messaging system, of an application installed in a corresponding one of the first function unit and the second function unit.

9. The relay device according to claim 1, wherein the first function unit information and the second function unit information are each information that allows recognition of communication paths to be used in communication that should be newly performed in a new network, and a communication traffic in each of the communication paths, the new network being obtained after execution of addition or removal of the first function unit or the second function unit with respect to a network including one or a plurality of the first function units and one or a plurality of the second function units.

10. The relay device according to claim 1, further comprising
a provision unit configured to provide, based on the database, the second function unit information after the conversion process, to a management unit configured to update configuration information indicating a setting content for performing communication in a new network obtained after execution of addition or removal of the first function unit or the second function unit with respect to a network including one or a plurality of the first function units and one or a plurality of the second function units.

11. A communication method to be performed in a relay device, the relay device installed in a vehicle and configured to relay information transmitted and received between a first function unit connected to a first transmission path and a second function unit connected to a second transmission path, the communication method comprising the steps of:
detecting addition, to an in-vehicle network, of a first new function unit that is the first function unit capable of communicating in a first communication network, or addition, to the in-vehicle network, of a second new function unit that is the second function unit capable of communicating in a second communication network;
in response to a detection of the addition of the first new function unit to the in-vehicle network, acquiring, from the first new function unit, first function unit information of the first function unit, the first function unit information including information regarding a first network configuration of a layer of a lower order than an application layer;
in response to a detection of the addition of the second new function unit to the in-vehicle network, acquiring, from the second new function unit, second function unit information of the second function unit, the second function unit information including information regarding a second network configuration of the layer of the lower order than the application layer; and
in response to the detection of the addition of the second new function unit to the in-vehicle network, performing a conversion process of converting the acquired second function unit information into information that is able to be registered into a database of one or a plurality of pieces of the first function unit information of one or a plurality of the first function units, wherein
the conversion process is a process of converting a plurality of elements included in the second function unit information into a plurality of elements included in the first function unit information, the plurality of elements included in the first function unit information including an ID of the function unit, a function of the function unit, an availability of LAG support, an ID of a function unit of a data transmission destination, and communication traffic.

12. A computer-readable non-transitory storage medium having stored therein a communication program to be used in a relay device, the relay device installed in a vehicle and configured to relay information transmitted and received between a first function unit connected to a first transmission path and a second function unit connected to a second transmission path, the communication program being for causing a computer to function as:
a detection unit configured to detect addition, to an in-vehicle network, of a first new function unit that is the first function unit capable of communicating in a first communication network, or addition, to the in-vehicle network, of a second new function unit that is the second function unit capable of communicating in a second communication network;
an acquisition unit configured to:
in response to a detection of the addition of the first new function unit to the in-vehicle network, acquire, from the first new function unit, first function unit information of the first function unit, the first function unit information including information regarding a first network configuration of a layer of a lower order than an application layer; and
in response to a detection of the addition of the second new function unit to the in-vehicle network, acquire, from the second new function unit, second function unit information of the second function unit, the second function unit information including information regarding a second network configuration of the layer of the lower order than the application layer; and
a conversion unit configured to perform, in response to the detection of the addition of the second new function unit to the in-vehicle network, a conversion process of converting the second function unit information acquired by the acquisition unit into information that is able to be registered into a database of one or a plurality of pieces of first function unit information of one or a plurality of the first function units, wherein
the conversion process is a process of converting a plurality of elements included in the second function unit information into a plurality of elements included in the first function unit information, the plurality of elements included in the first function unit information including an ID of the function unit, a function of the function unit, an availability of LAG support, an ID of a function unit of a data transmission destination, and communication traffic.

* * * * *